United States Patent
Kanazawa et al.

(10) Patent No.: US 7,224,079 B2
(45) Date of Patent: May 29, 2007

(54) DRIVING/ELECTRIC-POWER GENERATING SYSTEM FOR VEHICLE

(75) Inventors: Hiroshi Kanazawa, Chiyoda-ku (JP); Takashi Kobayashi, Chiyoda-ku (JP); Noriaki Hino, Chiyoda-ku (JP); Shinji Shirakawa, Chiyoda-ku (JP); Keiichi Mashino, Chiyoda-ku (JP); Masanori Tsuchiya, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/177,392

(22) Filed: Jul. 11, 2005

(65) Prior Publication Data
US 2006/0006655 A1   Jan. 12, 2006

(30) Foreign Application Priority Data
Jul. 12, 2004   (JP) .............................. 2004-204160

(51) Int. Cl.
F02D 29/06 (2006.01)
H02P 9/04 (2006.01)
H02P 9/00 (2006.01)
F02N 11/06 (2006.01)
H02S 1/00 (2006.01)

(52) U.S. Cl. .................... 290/40 B; 322/7; 322/24; 290/40 R

(58) Field of Classification Search .......... 290/40 B, 290/40 C, 40 R; 363/37, 89, 97, 98, 132; 322/7, 24
See application file for complete search history.

(56) References Cited

U.S. PATENT DOCUMENTS

| | | | | |
|---|---|---|---|---|
| 5,387,859 A | * | 2/1995 | Murugan et al. | 322/10 |
| 5,414,339 A | * | 5/1995 | Masaki et al. | 318/800 |
| 5,650,707 A | * | 7/1997 | Lipo et al. | 318/773 |
| 5,650,713 A | * | 7/1997 | Takeuchi et al. | 322/16 |
| 6,005,297 A | * | 12/1999 | Sasaki et al. | 290/4 C |
| 6,166,498 A | * | 12/2000 | Yamaguchi et al. | 318/34 |
| 6,236,583 B1 | * | 5/2001 | Kikuchi et al. | 363/132 |
| 6,643,157 B2 | * | 11/2003 | Furukawa et al. | 363/132 |
| 2004/0084229 A1 | * | 5/2004 | Stancu et al. | 180/65.1 |

FOREIGN PATENT DOCUMENTS

| | | | |
|---|---|---|---|
| JP | 405146124 A | * | 6/1993 |
| JP | 2004-007964 | | 1/2004 |

* cited by examiner

*Primary Examiner*—Julio C. Gonzalez
(74) *Attorney, Agent, or Firm*—Crowell & Moring LLP

(57) ABSTRACT

An AC generator comprises a rotor and a stator having a three-phase winding. A three-phase inverter is connected to the three-phase winding. Here, the three-phase winding comprises at least two independent three-phase windings. Switching elements for respective phases of the three-phase inverter are connected in parallel by the number of the independent three-phase windings, and in-phase windings are individually connected to their parallel switching elements.

8 Claims, 26 Drawing Sheets

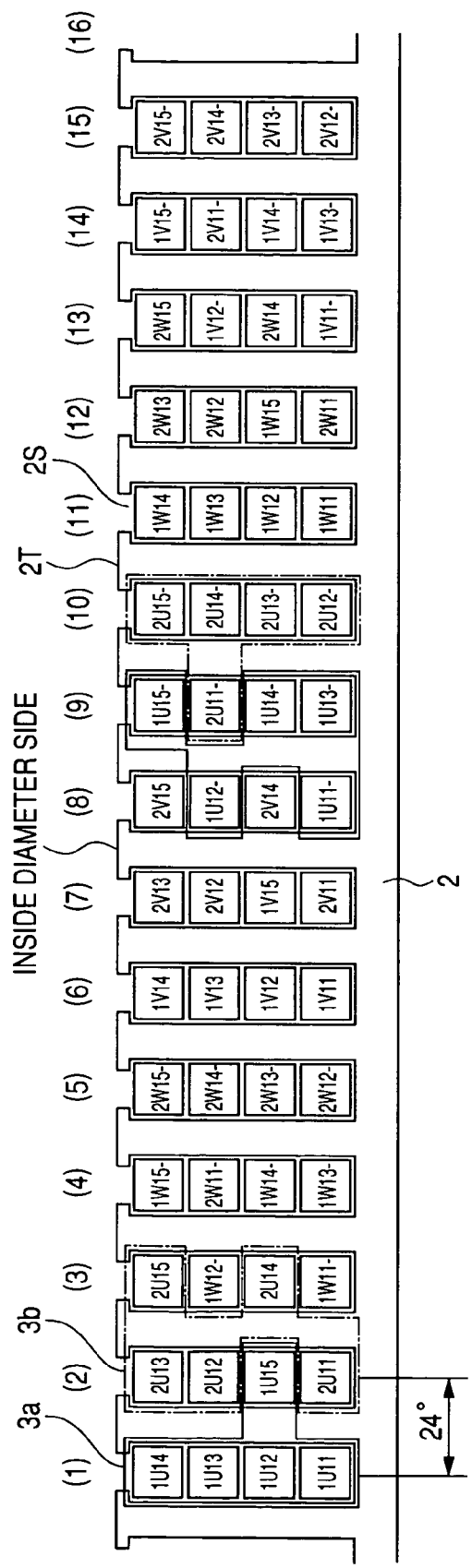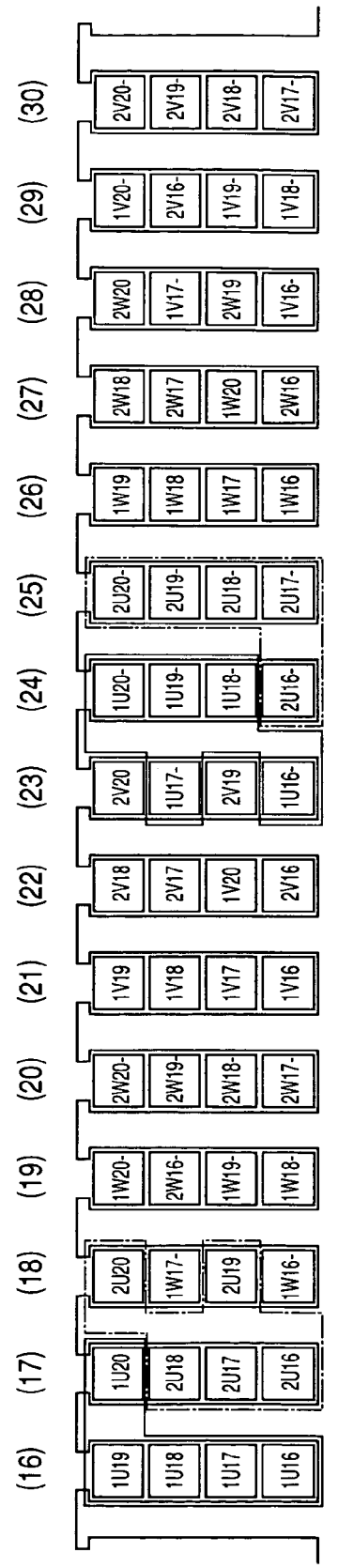
FIG. 6(A)
FIG. 6(B)

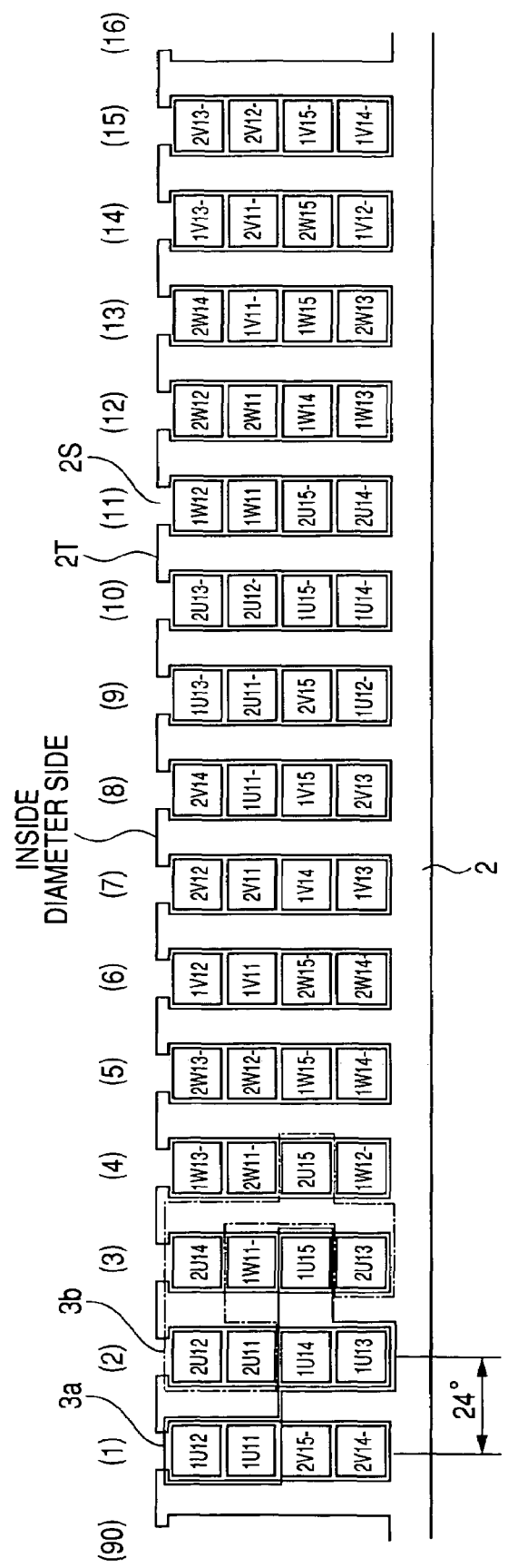

DRIVING/ELECTRIC-POWER GENERATING SYSTEM FOR VEHICLE

CLAIM OF PRIORITY

The present application claims priority from Japanese application serial no. 2004-204160, filed on Jul. 12, 2004, the contents of which are hereby incorporated by references into this application.

FIELD OF THE INVENTION

The present invention relates to a driving/electric-power generating system for vehicle using a vehicle AC generator, and particularly to the driving/electric-power generating system for vehicle suitable as an automobile starting actuator/electric power generator.

BACKGROUND ART

As a driving/electric-power generating system using a conventional vehicle AC generator, there has been known one in which has a three-phase winding and a three-phase inverter as described in, for example, Japanese Patent Laid-Open No. 2004-7964.

In the driving/electric-power generating system for vehicle described in Japanese Patent Laid-Open No. 2004-7964, however, since the application of the three-phase inverter is considered for a vehicle AC generator having one three-phase winding, the three-phase inverter cannot drive a vehicle AC generator having plural set of independent three-phase windings. In the application of the three-phase inverter to the vehicle AC generator having two set of independent three-phase windings, for example in case of using the vehicle AC generator as an actuator (motor for driving), if assuming that in-phase windings having a phase difference in the two independent three-phase windings are connected to each other without particular considerations at driving, circulating currents flow in in-phase windings because the in-phase windings have the phase difference, thereby causing an increase in the amount of heat generated.

Also, since the vehicle AC generator becomes a three-phase generator at the generation of electric power, a ripple voltage of a rectified voltage increases. Further since a circulating current flows even at the power generation where an electrical phase difference exists between the in-phase coils, a generated current decreases. Accordingly, such a driving/electric power generating system is accompanied by the problem that noise increases as well as a reduction in the efficiency of power generation, and a reduction in efficiency due to an increase in the amount of generated heat is incurred.

An object of the present invention is to provide a driving/electric-power generating system for vehicle which can reduce the amount of heat generated at driving to improve drive efficiency and can increase the efficiency of generation of electric power.

SUMMARY OF THE INVENTION (1) In order to achieve the above object, the present invention is constituted as follows. The driving/electric-power generating system for vehicle drive comprises an electric rotating machine comprised of a rotor and a stator having a three-phase winding, and a three-phase inverter connected to the three-phase winding. Wherein, the three-phase winding is comprised of at least two independent three-phase windings. And wherein, switching elements for respective phases in the three-phase inverter are connected in parallel by the number of windings in the independent three-phase windings, and in-phase windings are individually connected to the respective parallel switching elements.

With such a configuration, it is possible to reduce the amount of heat generated at driving to thereby improve drive efficiency, and increase the efficiency of power generation.

(2) In the above (1), preferably, the windings small in phase difference, of the independent three-phase windings are divided into groups corresponding to three phases. And the switching elements of the inverter, which are connected to the windings belonging to the same groups, are driven by the same gate signal.

(3) In the above (2), preferably, the gate signal of the inverter is based on a 180° voltage-driven system.

(4) In the above (2), preferably, respective one-phase coils of the independent three-phase windings are disposed so as to straddle a plurality of slots.

(5) In the above (2), preferably, an on-off timing of the three-phase inverter corresponds to a phase center of induced voltages of plural windings driven simultaneously.

(6) In the above (2), preferably, the switching elements are MOS-FETs. And a timing provided to perform switching to MOS rectification upon an electric power generating operation of the electric rotating machine is produced based on a coil current delayed in phase, of the same phase coils of the independent three-phase windings.

(7) In the above (6), preferably, the coil current delayed in phase is detected from a current of a diode disposed in parallel with each of the MOS-FETs.

(8) In the above (6), preferably, upon the electric power generating operation of the electric rotating machine, diode rectification is taken when the current that flows through the electric rotating machine is of a low current, and MOS rectification is taken when the current is of a high current.

(9) In the above (1), preferably, the switching elements of the inverter are mounted integrally with the electric rotating machine.

(10) In the above (1), preferably, the windings small in phase difference, of the independent three-phase windings are divided into groups corresponding to three phases. And the switching elements of the inverter, which are connected to the windings, are respectively controlled by independent gate signals and the inverter is of a 180° voltage-driven system.

(11) In the above (10), preferably, the switching elements are MOS-FETs. And upon the electric power generating operation of the electric rotating machine, the gate signals that drive the MOS-FETs are produced by converting diode currents flowing through individual diodes to voltages. And a reference voltage for producing an on-signal of the gate signals and a reference voltage for producing an off-signal of the gate signals are different from each other in voltage.

(12) In the above (11), preferably, upon the electric power generating operation of the electric rotating machine, the reference voltage for the off signal of the gate signals is higher than that for the on-signal of the gate signals.

(13) In the above (11), preferably, the independent three-phase windings are constituted of at least a pair of a Y-connection and a Δ-connection. And the respective windings are set identical in the number of turns, and one three-phase winding is used for driving and generation of electric power and the other three-phase winding is used only for generation of electric power.

(14) In the above (13), preferably, the Y-connection and Δ-connection are respectively connected to an inverter.

[Effects of the Invention]

According to the present invention, it is possible to reduce the amount of heat generated at driving to thereby improve drive efficiency, and increase the efficiency of electric power generation.

BRIEF DESCRIPTION OF THE DRAWINGS

FIG. 6 is a coil layout diagram depicting another example illustrative of stator windings of the vehicle AC generator.

FIG. 7 is a coil layout diagram showing stator windings of the vehicle AC generator.

DETAILED DESCRIPTION OF THE PREFERRED EMBODIMENTS

A configuration of a driving/electric-power generating system for vehicle according to one embodiment of the present invention will hereinafter be described using FIGS. 1 through 29.

Figure 1:
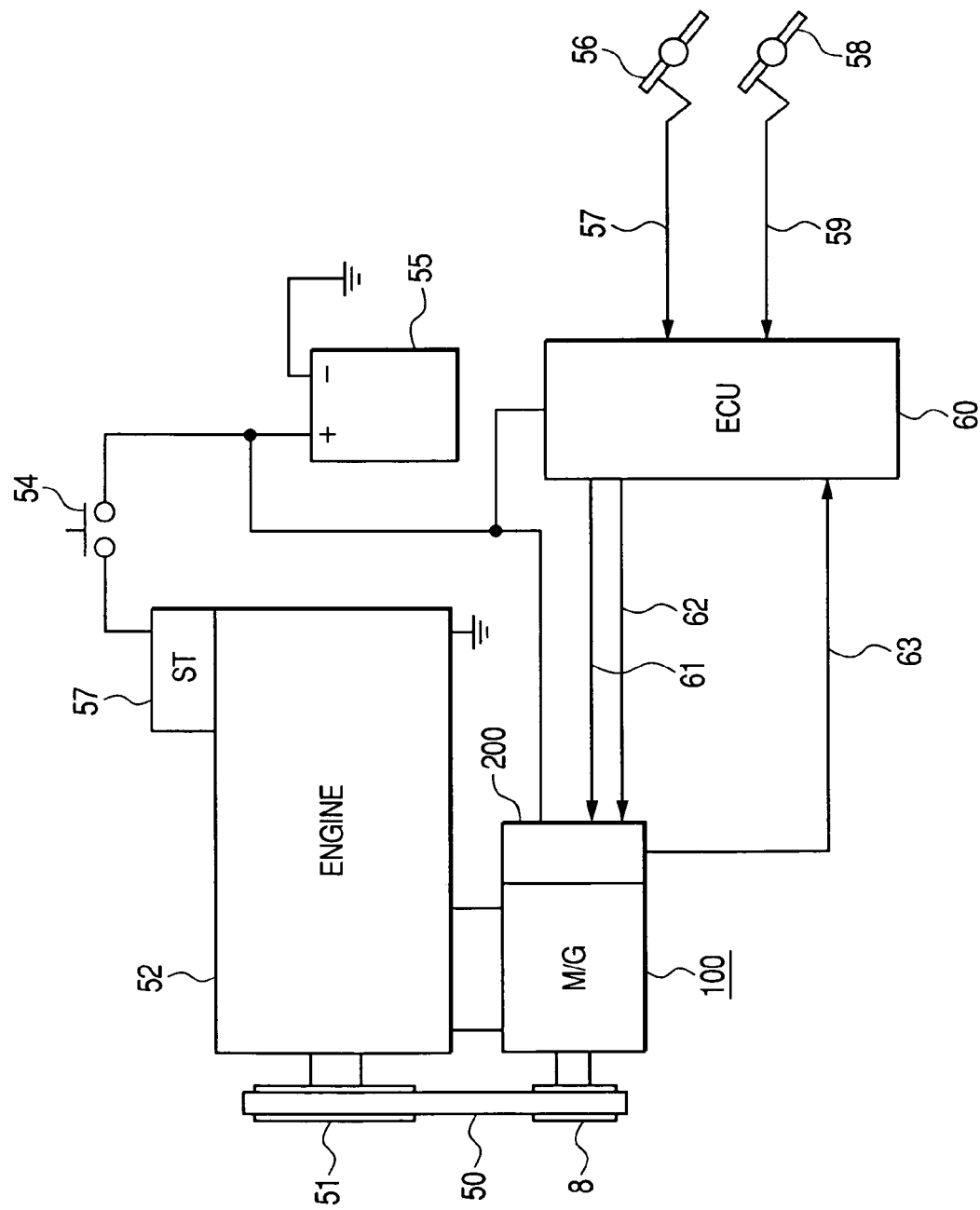
FIG. 1 is a system configuration diagram showing a driving/electric-power generating system for vehicle according to one embodiment of the present invention.

An overall configuration of the driving/electric-power generating system will first be explained using FIG. 1. FIG. 1 is a system configurational diagram thereof.

A starter motor 53 is mounted to an engine 52 and used to start the engine 52. The starter motor 53 is actuated by operating a key switch 54 by a car driver. Electric power of a battery 55 is used as a power supply thereof.

A positive terminal and a negative terminal of the battery 55 are electrically connected to a vehicle AC generator 100. The negative terminal of the battery 55 is also connected to a vehicle body as an earth. The vehicle AC generator 100 (it is called simply "AC generator" hereafter) is constituted by a motor-generator, and a power transfer between the AC generator 100 and engine 52 is carried out through a crank pulley 51, a pulley 8 and a belt 50. The belt 50 always rotates in the same direction, and the AC generator 50 has the following two different operation modes. In a generator-mode, AC generator 100 is rotated by the engine 52 through the belt 50, and in a motor-mode, the engine 52 is rotated by the AC generator 100 as motor function through the belt 50. Thick lines in the figure indicate electric power lines, and thin lines in the figure indicate signal lines.

A drive unit 200 including an inverter circuit is provided inside the AC generator 100. Signals between the drive unit 200 and an ECU (Engine Control Unit) 60 are an engine start signal 61, an electric power generation command signal 62 and a number-of-revolutions signal 63. An accelerator signal 57 for sensing the amount of depression of an accelerator pedal 56 and a brake signal 59 for sensing the amount of depression of a brake pedal 58 are taken into the ECU 60.

Figure 2:
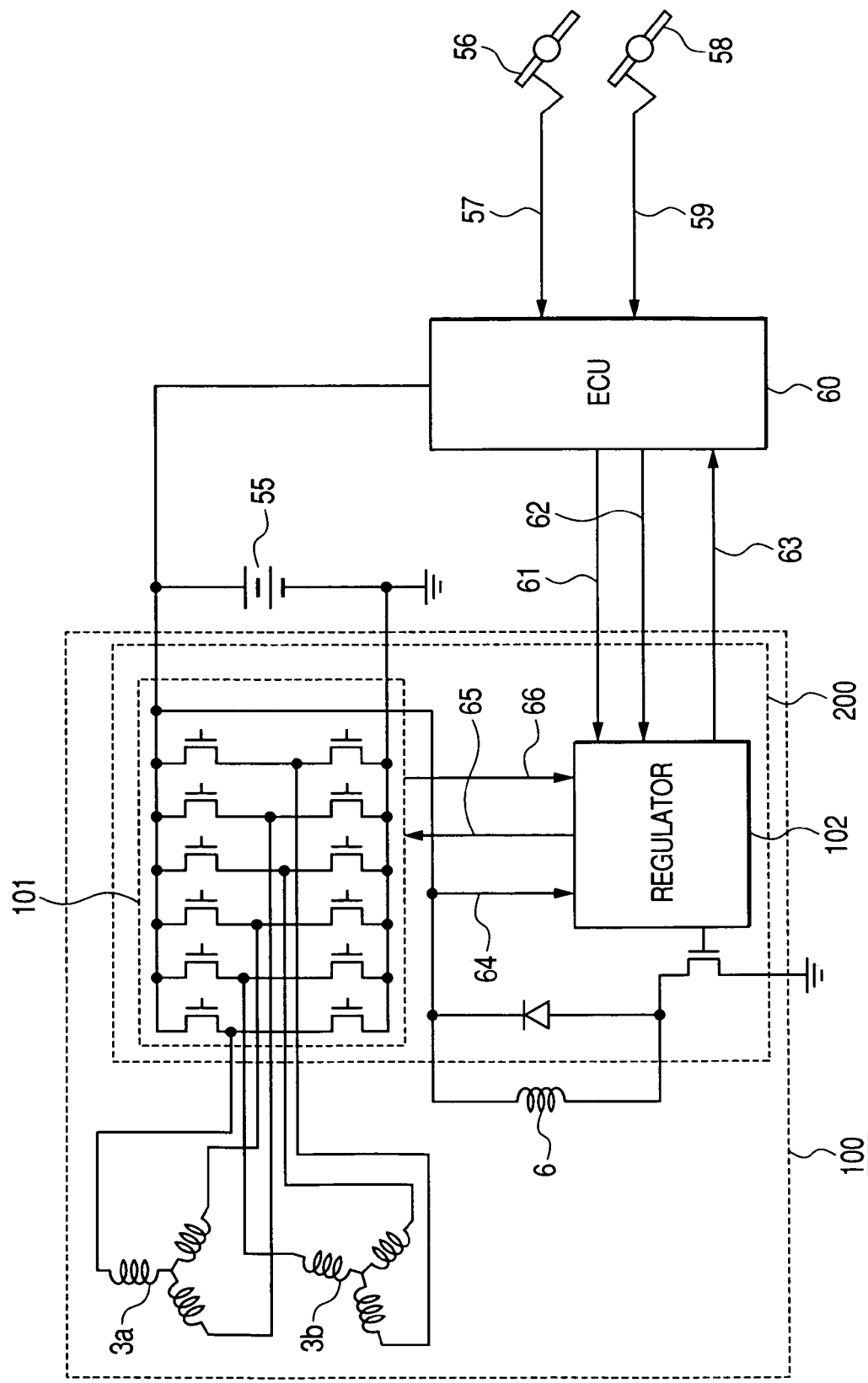
FIG. 2 is a block diagram illustrating a configuration of a vehicle AC generator in the driving/electric-power generating system for vehicle according to one embodiment of the present invention.

A configuration of the AC generator 100 used for the driving/electric-power generating system for vehicle according to the present embodiment will next be explained using FIG. 2. FIG. 2 is a block diagram showing the configuration thereof. Incidentally, the same reference numerals as those shown in FIG. 1 indicate the same parts respectively.

The AC generator 100 comprises two independent three-phase windings 3a and 3b. The three-phase windings 3a and 3b have neutral points disconnected from each other. The phases of in-phase coils of the three-phase windings are shifted by approximately 30 electrical degrees with respect to each other. The drawing indicates a state in which the three-phase winding 3b is delayed by 30° with respect to the three-phase winding 3a.

The drive unit 200 built in the AC generator 100 is equipped with an inverter unit 101 capable of effecting a motor operation on the three-phase windings of the AC generator, and a regulator 102 which controls a field winding current.

Since the number of output terminals of two three-phase windings 3a and 3b are six, the number of drive elements (semiconductor switching elements such as IGBTs, MOSFETs or the like) of the inverter unit 101 is twelve at upper and lower arms, and terminals for the respective phases are electrically connected to midpoints between upper and lower arms.

The engine start signal 61 and the electric power generation command signal 62 are inputted from the ECU 60 to the regulator 102. The number-of-revolutions signal 63 from the regulator is outputted to the ECU 60. A battery voltage signal 64 indicating the voltage of the battery 55 and a diode voltage signal 66 corresponding to a voltage across a diode included in the inverter unit 101 are inputted to the regulator 102. A gate signal 65 for driving each drive element of the inverter unit 101 is outputted to the inverter unit 101. Also the regulator 102 controls a field current flowing through a field coil 6 of the AC generator 100.

The operation of the driving/electric-power generating system for vehicle shown in FIGS. 1 and 2 will next be explained.

In FIG. 1, since the viscosity of engine oil in the engine is high when the engine 52 is cold, high starting engine torque is needed to start up the engine. Therefore, when starting up the engine with the engine cold, it is necessary to actuate the starter motor 53 by operating the key switch 54 by the car driver.

On the other hand, since the viscosity of the engine oil is lowered when the engine sufficiently warmed up, the friction resistance of the engine is reduced, and the engine can be started up with smaller torque as compared with the engine cold start. Therefore, when restarting the engine subsequent to an idle stop in the state where the engine warmed up, the AC generator 100 becomes to the motor mode to start up the engine 52. For example, when zero speed of the vehicle is detected by a sensor at the time when the driver takes off his/her foot from an accelerator pedal 56 and depresses a brake pedal, the ECU 60 determines whether or not to stop the engine or keep it in an idle state. When the ECU 60 makes a decision as to a wait for traffic lights to change or a traffic jam, for example, the engine is stopped. Next, when the driver takes off his/her foot from the brake pedal 58 and depresses the accelerator pedal 56, the accelerator signal 57 is outputted to the ECU 60. Accordingly, the ECU 60 outputs the engine start signal 61 to the drive unit 200 built in the AC generator 100. Since the drive unit 200 is equipped with the inverter unit 101 capable of effecting the motor operation on the three-phase windings of the AC generator, and the regulator 102 which controls the field winding current, when the engine start signal 61 outputted from the ECU 60 is turned on and inputted to the drive unit 200, the AC generator 100 is actuated as a motor by the drive unit 200. Since, at this time, the engine 52 is connected to the AC generator 100 through the pulley and belt, the AC generator 100 can rotate the engine to start up it. When the engine is started up, the number-of-revolutions signal 63 is fed back to the ECU 60 from the drive unit 200, the ECU 60 turns off the engine start signal 61 and turns on the electric power generation command signal 62 to switch the AC generator 100 from the motor operation to a generator operation mode.

With the above operation, the AC generator is roughly divided into the case in which it operates as the motor and the case in which it operates as the generator.

Figure 3:
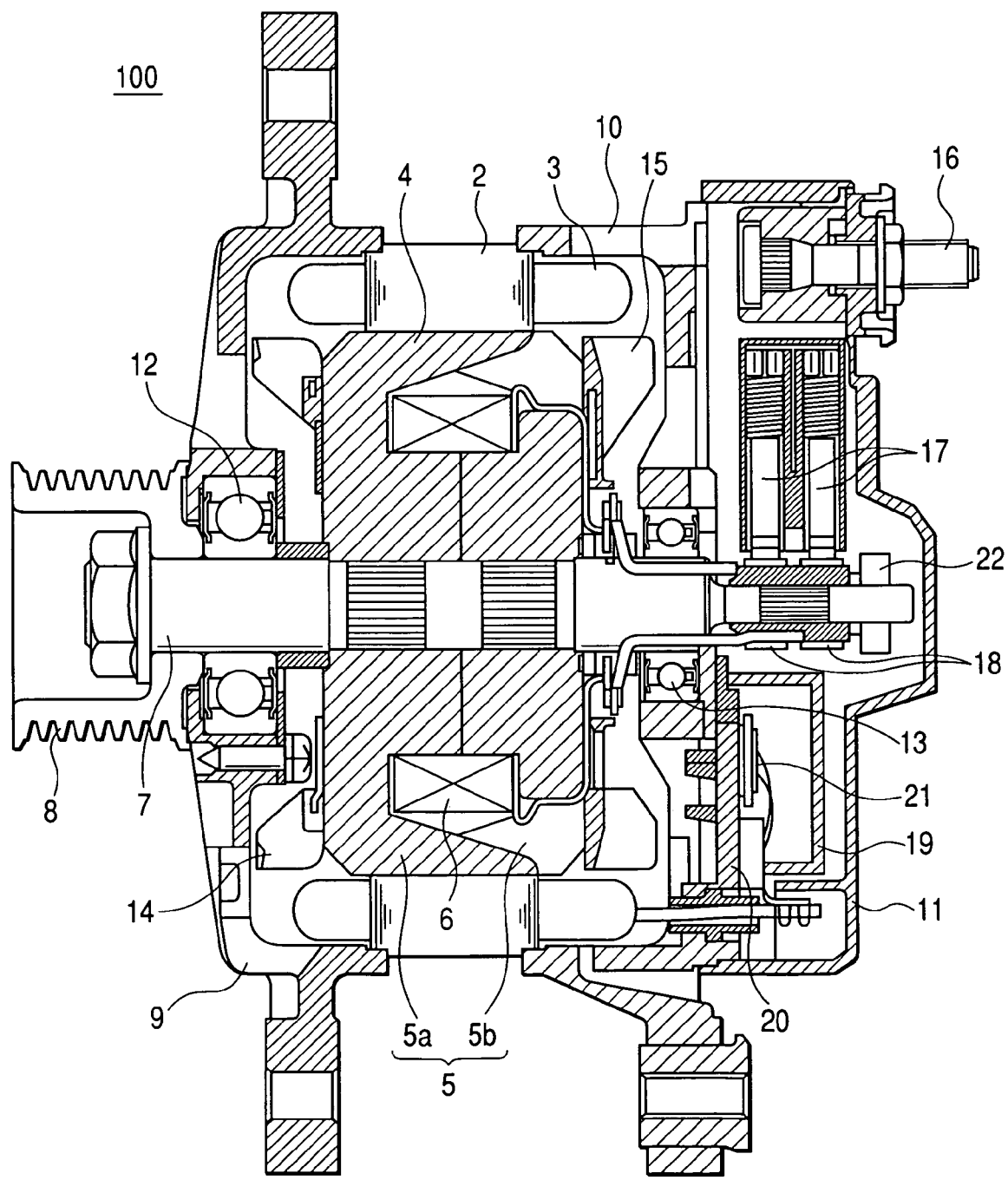
FIG. 3 is a sectional view depicting the vehicle AC generator.

The configuration of the AC generator used for the driving/electric-power generating system for vehicle according to the present embodiment will next be explained using FIG. 3. FIG. 3 is a cross-sectional view of the AC generator.

The AC generator shown in FIG. 3 is of a AC generator capable of driving the motor as mentioned above and is different from a general vehicle AC generator in that an inverter necessary when driven as the motor is built therein.

As a cooling system of the AC generator, there are known two ways of a water-cooled system which allows an engine coolant to pass through the outer peripheral portion of a stator, and an air-cooled system using an inner fan. However, the air-cooled one will be described here. In order to improve the generator/motor performance, it is one in which a permanent magnet may be disposed between pawl poles.

A rotor 4 of the AC generator is comprised of a rotor shaft 7 and plural pairs of pawl poles 5 (5a and 5b). A pulley 8 is fixed to the rotor shaft 7. In the rotor 4, a field winding 6 is wound on the inner peripheral side of the pawl pole 5 thereof, and cooling fans 14 and 15 are provided at both end surfaces thereof as viewed in its axial direction.

A stator 2 is arranged around the outer peripheral side of the rotor 4, and the previously-described three-phase windings 3 are wound around the stator 2 as two sets. The stator 2 is interposed between a front bracket 9 and a rear bracket 10 in an axial direction of the generator. The respective brackets 9 and 10 rotatably support the shaft 7 with bearings 12 and 13.

A DC current is supplied through a slip ring 18 attached to the shaft 7 and a brush 17 to the field winding 6 disposed on the rotor 4. Thereby, a rotating magnetic field is generated in the axial direction. Electric power is supplied from an in-vehicle battery to the brush 17 through battery terminals 16. Thus, when the previously-described pawl pole 5a is of an N pole, the pawl pole 5b becomes an S pole. The intensity of excited magnetization of the pawl pole 5 is proportional to the magnitude of a field current.

A magnetic pole sensor 22 is disposed at an opposite side of the pulley on the shaft 7 and used as a means for detecting a magnetic pole position of the rotor. A heat sink 20 is provided inside a rear cover 11 in contact with the rear bracket 10. The rear cover 11 is attached at one end of the rear bracket 10 so as to cover the end of the rear bracket. As shown in FIG. 2A, the power element 21 of the inverter unit 101 provided in the drive unit 200 is attached to the heat sink 20. Heat generated from the power element 21 is radiated through the heat sink 20 to reduce the loss of the power element 21. A power module 19 comprises the heat sink 20 and the power element 21.

A connection configuration of stator windings of the AC generator used in the driving/electric-power generating system for vehicle according to the present embodiment will next be explained using FIGS. 4 and 5.

Figure 4:
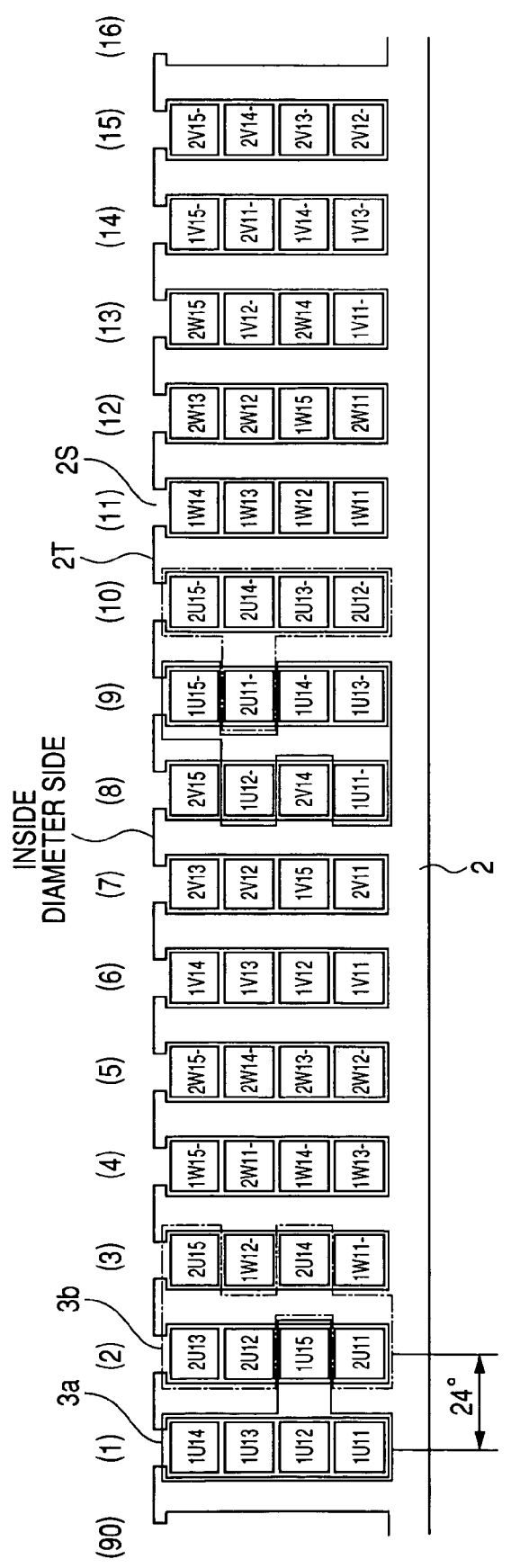
FIG. 4 is a coil layout diagram showing stator windings of the vehicle AC generator.

FIG. 4 is a coil layout diagram showing stator windings of the AC generator in the driving/electric-power generating system. FIG. 5 is a connection diagram showing the stator windings of the AC generator.

Figure 5B:
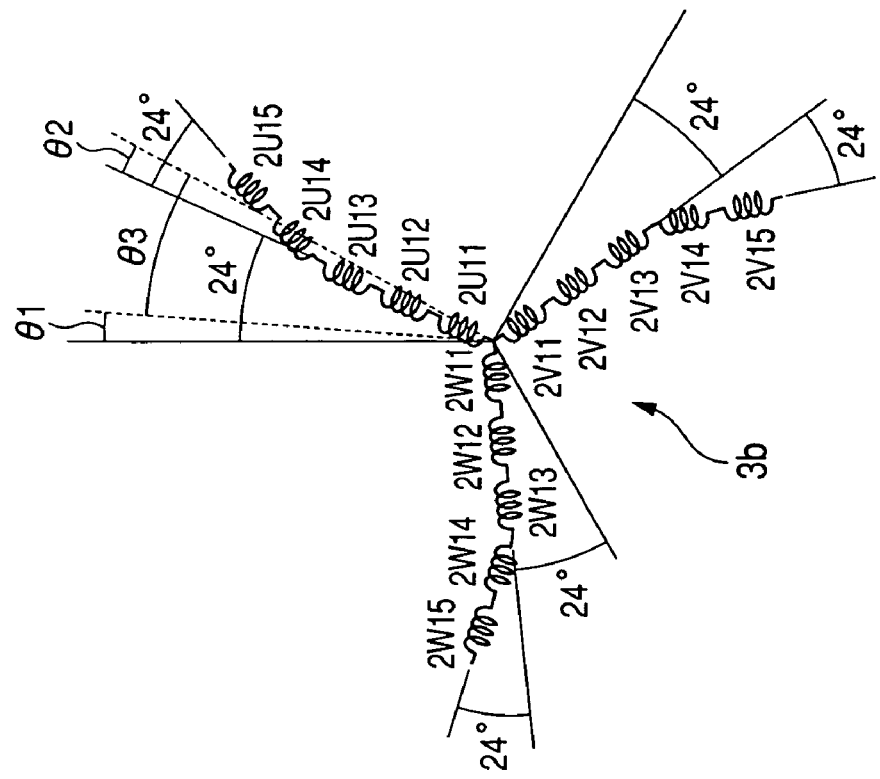
FIG. 5 is a connection diagram illustrating the stator windings of the vehicle AC generator.
Figure 5A:
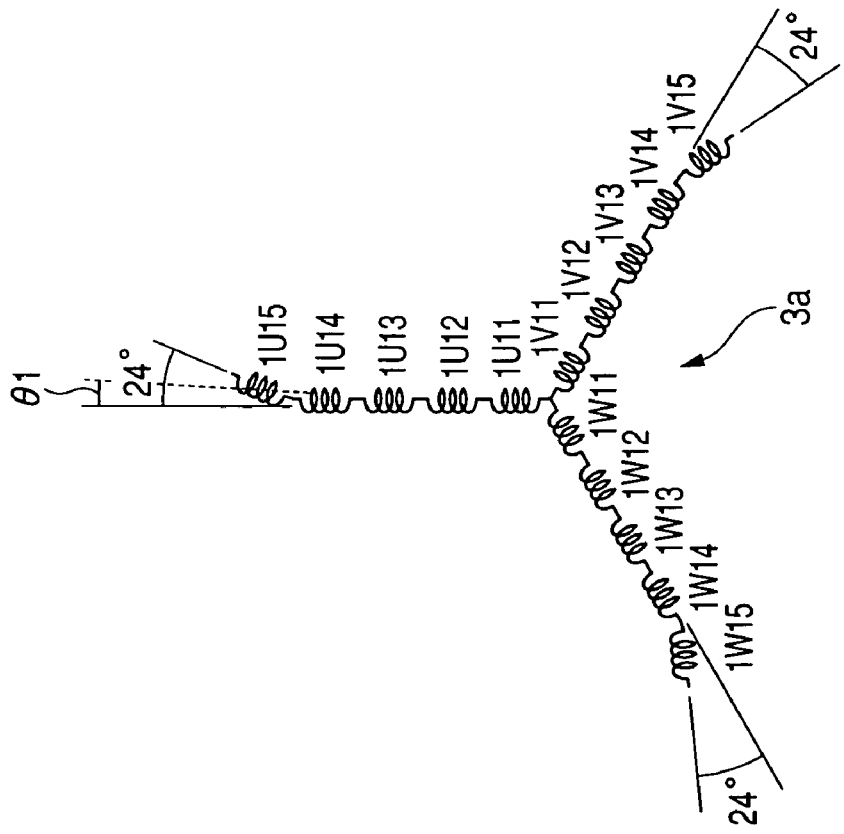

A description will now be made of an example in which the number of slots of the stator is assumed to be 90, the number of poles of the rotor is assumed to be 12 and the number of slots for each pole and phase is 2.5. FIG. 4 is one example of a coil layout and shows 15 slots equal to one-sixth the number of slots 90. That is, the number thereof is equivalent to the two poles of the rotor. In the present example, the stator 2 is illustrated so as to linearly extend for simplification of the figure. FIG. 5(A) shows a three-phase winding 3a corresponding to a first coil group, and FIG. 5(B) shows a three-phase winding 3b corresponding to a second coil group, respectively.

In FIG. 4, numerals with parentheses indicate slot numbers respectively. The stator 2 comprises a plurality of teeth 2T and slots 2S formed among these teeth 2T. Coils are respectively disposed inside the slots 2S.

Since the number of slots is fifteen with respect to the two poles of the rotor, the electrical phase of one slot becomes 24°. Windings disposed within one slot are expressed in four conductors. U-phase windings of a first coil group shown in FIG. 4 comprise ten conductors of 1U11 through 1U15 and 1U11− through 1U15− opposite in current direction. U-phase windings of a second coil group comprise ten conductors of 2U11 through 2U15 and 2U11− through 2U15− . Since the three-phase windings are provided in two pairs, the illustrated total number of conductors results in sixty.

As shown in FIG. 5(A), 1U, 1V and 1W phases of the three-phase windings respectively have phase differences of 120° thereamong. Also as shown in FIG. 5(B), 2U, 2V and 2W phases respectively have phase differences of 120° thereamong. As shown in FIG. 4, the 1U-phase coils 1U11 through 1U15 of the first coil group are disposed with being divided into the slot numbers (1) and (2). In the example, the 1U-phase coils 1U11 through 1U14 are disposed to the slot number (1), and the 1U-phase coil 1U15 is disposed to the slot number (2). Thus, as shown in FIG. 5(A), the 1U-phase coil 1U15 is 24° out of phase with the 1U-phase coils 1U11 through 1U14. The 1U-phase coils 1U11 through 1U15 are $\theta 1$ (=4.8°) out of phase as a whole assuming that the 1U-phase coils 1U11 through 1U14 are taken as the reference.

On the other hand, as shown in FIG. 4, the 2U-phase coils 2U11 through 2U15 of the second coil group are disposed with being divided into the slot numbers (2) and (3). In this example, the 2U-phase coils 2U11 through 2U13 are disposed to the slot number (2), and the 2U-phase coils 2U14 and 2U15 are disposed to the slot number (3). Thus, as shown in FIG. 5(B), the 2U-phase coils 2U14 and 2U15 are 24° out of phase with the 2U-phase coils 2U11 through 2U13. The 2U-phase coils 2U11 through 2U15 are $\theta 2$ (=9.6°) out of phase as a whole assuming that the 2U-phase coils 2U11 through 2U14 are taken as the reference. Thus, the difference $\theta 3$ in phase between the 1U-phase coil and the 2U-phase coil results in 28.8°.

Another connection configuration of the stator windings of the AC generator in the driving/electric-power generating system will next be explained using FIG. 6.

FIG. 6 is a coil layout diagram showing another example of the stator windings of the AC generator in the driving/electric-power generating system for vehicle according to one embodiment of the present invention. Incidentally, the same reference numerals as those shown in FIG. 4 indicate the same parts respectively.

In the example illustrated in FIG. 4, the U-phase coils disposed on the inner peripheral sides in the case of the coil layout from the slot numbers (1) through (15) are three in the number of 2U phases and two in the number of 1U phases, thereby causing a difference in inductance.

If such a coil layout as shown in FIG. 6 is taken in contrast, unbalance in inductance can be avoided. FIG. 6(A) shows slots numbers (1) through (15), and FIG. 6(B) shows slot numbers (16) through (30).

While the slot numbers (1) through (15) shown in FIG. 6(A) are identical to those shown in FIG. 4, coils are interchanged between the slot numbers (16) and (30) shown in FIG. 6(B) to cancel out unbalance in inductance. In order to correct the slot number (2) in a 1U phase of FIG. 6(A), for example, a coil on the inside diameter side and a third coil as viewed from the inside diameter side are replaced with each other in the slot number (17) of FIG. 6(B).

Thus, the number of the conductors disposed in the slots between the two three-phase windings are arranged so as to be well balanced. It is therefore possible to prevent unbalance in current. Even as to the layout of other phases, the conductors are similarly arranged so as to be well-balanced in inductance.

Another connection configuration of stator windings of the AC generator in the driving/electric-power generating system according to the present embodiment will next be explained using FIGS. 7 and 8.

FIG. 7 is a coil layout diagram of the stator windings of the AC generator. FIG. 8 is another connection diagram of the stator windings of the AC generator. Incidentally, the same reference numerals as those shown in FIGS. 4 and 5 indicate the same parts respectively.

In the present example, two conductors disposed in each slot on the outside diameter side are placed with being shifted to the right by one slot with respect to the layout shown in FIG. 4. As shown in FIG. 7, for example, 1U-phase coils 1u11 through 1U15 of a first coil group are disposed so as to be separated into a slot number (1), a slot number (2) and a slot number (3). In this example, the 1U-phase coils 1u11 and 1U12 are disposed to the slot number (1), the 1U-phase coils 1U13 and 1U14 are disposed to the slot number (2), and the 1U-phase coil 1U15 is disposed to the slot number (3). Thus, the 1U11 coil and the 1U12 coil in the slot number (1) are electrically in phase as shown in FIG. 8 in the three-phase connection diagram in this case. Since, however, the 1U13 coil and the 1U14 coil in the slot number (2) are shifted one slot from the 1U11 coil and the 1U12 coils, they are displaced by 24° with respect to the 1U11 coil and 1U12 coil. Since the 1U15 coil is further shifted by 24°, the electrical phases of the three-phase windings are represented as shown in FIG. 8(A).

Figure 8B:
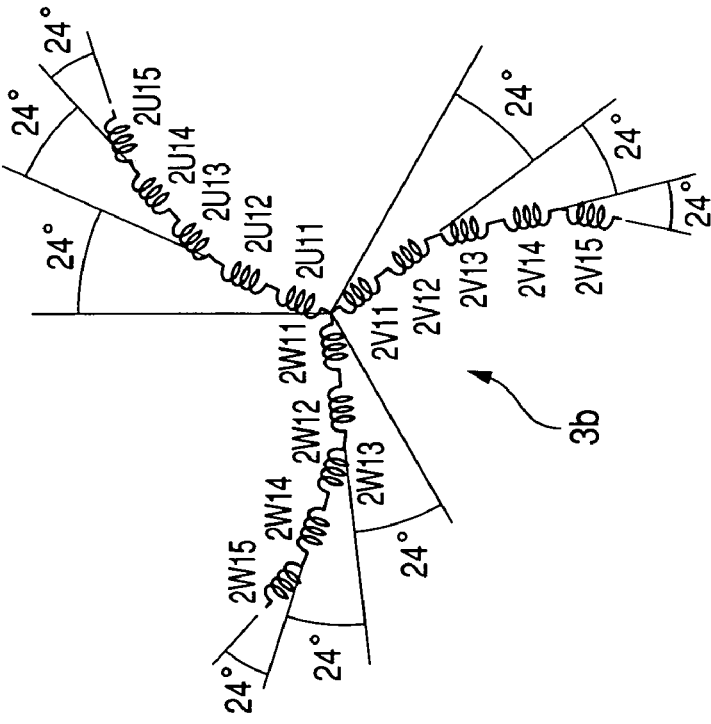
FIG. 8 is another connection diagram illustrating the stator windings of the vehicle AC generator.
Figure 8A:
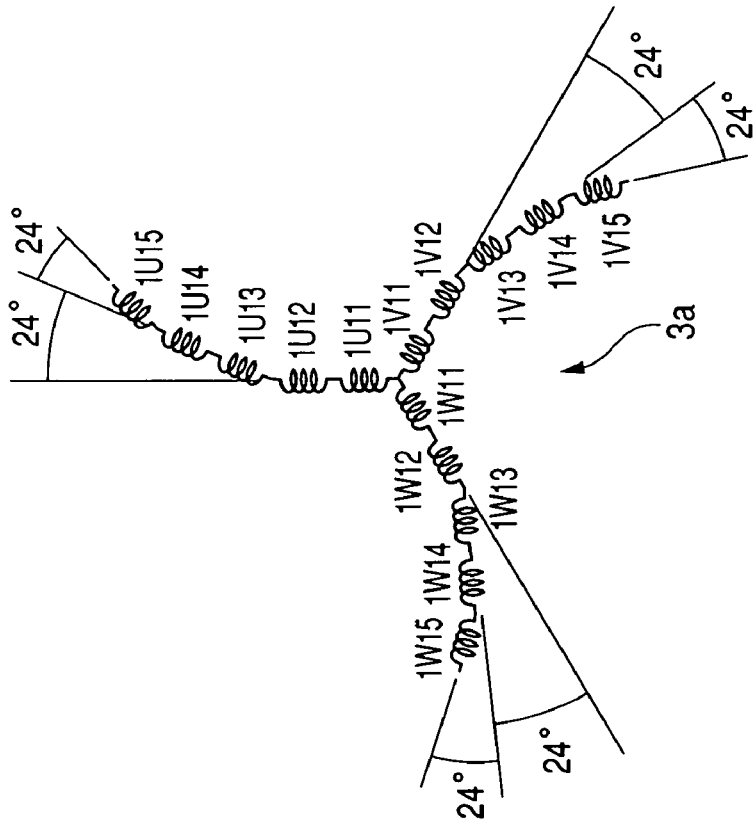

Similarly, a second coil group is represented like a three-phase winding diagram of FIG. 8(B) because the second coil group starts from the position shifted one slot as compared with the 1U11 coil set as the reference. In this case, the electrical phases of the first and second coil groups are shifted 24° with respect to each other.

A configuration and an operation at the time that the AC generator in the driving/electric-power generating system for vehicle according to the present embodiment is operated as a motor, will next be explained using FIGS. 9 and 10.

Figure 9:
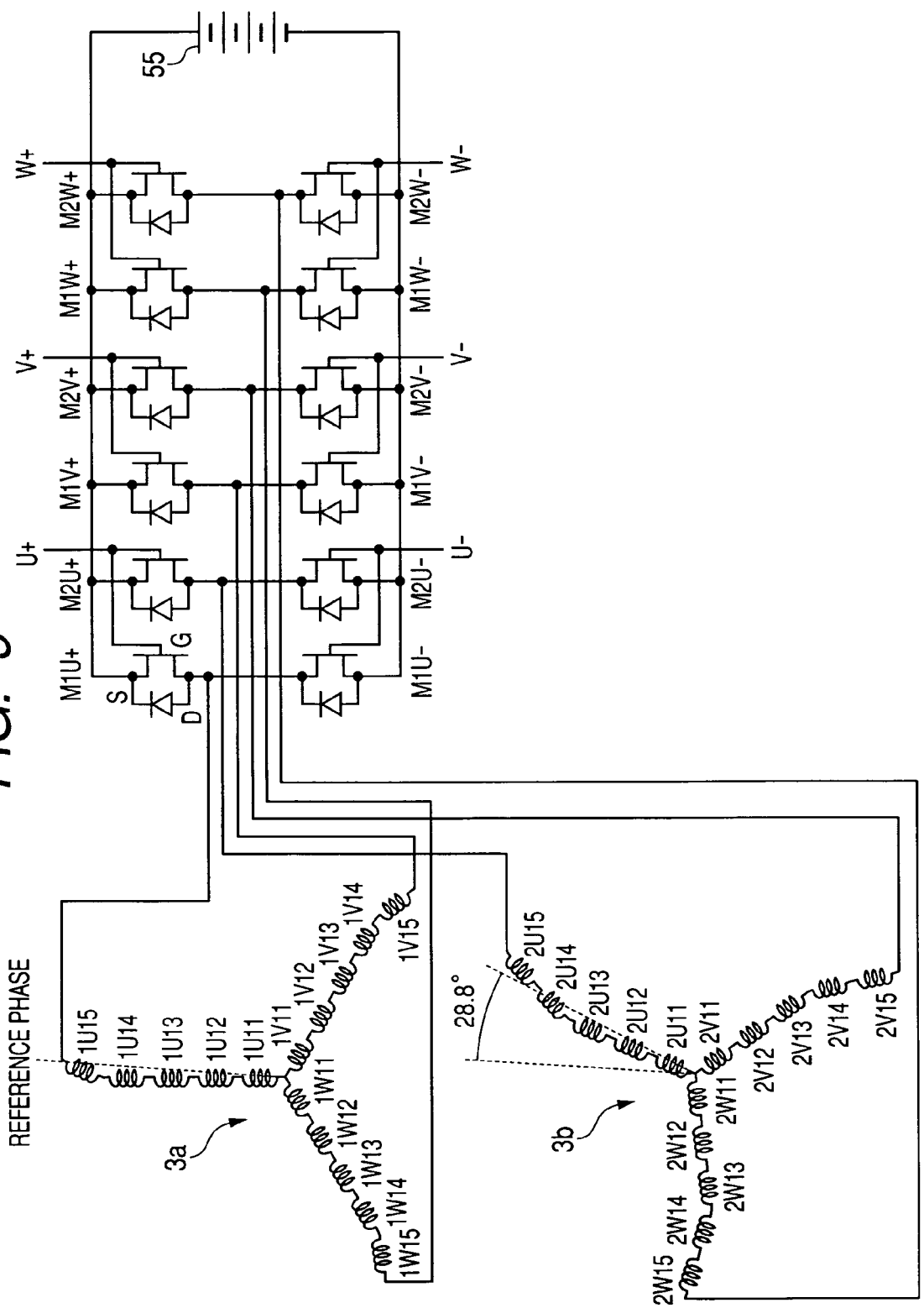
FIG. 9 is a circuit diagram showing the vehicle AC generator.

FIG. 9 is a circuit diagram showing the AC generator. FIG. 10 is an operation waveform diagram of the AC generator. Incidentally, the same reference numerals as those shown in FIGS. 1 through 8 indicate the same parts respectively.

As shown in FIG. 9, the AC generator of the present embodiment comprises two independent three-phase windings of a first coil group 3a and a second coil group 3b. Their in-phase coils are displaced by 28.8 electrical degrees with respect to each other. The two three-phase windings 3a and 3b are configured using twelve switching elements (e.g., MOS-FETs) M1U+ through M2W−. A connecting portion between the drain and source of the switching element M1U+ and the switching element M1U− is connected to its corresponding 1U phase of the first coil group 3a. A connecting portion of the switching element M2U+ and the switching element M2U− is connected to its corresponding 2U phase of the second coil group 3b corresponding to another three-phase winding. The four elements M1U+, M1U−, M2U+ and M2U− constitute a U phase. Similarly, the switching elements of V and W phases are also connected to the first coil group 3a and the second coil group 3b in parts.

The same signal is inputted to gates of M1U+ and M2U+ that belong to upper arms of the switching elements. M1V+ and M2V+ and M1W+ and M2W+ of other phases also take the same signals as gate signals respectively in the same manner as described above. As to the elements that constitute lower arms, M1U– and M2U–, M1V– and M2V–, and M1W– and M2W– are connected so as to operate at the same gate signals respectively. While the switching elements, each of which constitutes an inverter, provide six phases in the form of twelve as described above, the gate signals are taken as three phases and hence gate circuits are simplified.

In the present embodiment, a 180° voltage-driven system has been adopted without using PWM control. This is because since the AC generator according to the present embodiment is used as a starter for starting up the engine, there is no need to accurately control torque as in the case of motors used in an electric vehicle and a hybrid car. Since the neutral points are not connected although the in-phase coils of the first coil group 3a and the second coil group 3b have differences in phase, a problem about a circulating current does not occur either.

The gate signals for driving the switching elements M1U+ through M2W– will next be explained.

FIG. 10(a) shows an induced voltage e1U of the 1U phase and an induced voltage of the 2U phase. FIG. 10(b) illustrates a gate signal 1U+ used for obtaining the maximum torque with respect to the induced voltage of the 1U phase and a gate signal 2U+ used for obtaining the maximum torque with respect to the induced voltage of the 2U phase. It is desired that energization control is effected on the three-phase windings 3a and 3b having the two phase differences in accordance with the gate signal 1U+ and gate signal 2U+ shown in FIG. 10(b) respectively. In the present embodiment, however, there is a need to produce gate signals with the same signals with respect to the three-phase windings 3a and 3b having the two phase differences as shown in FIG. 9. Although the timing provided to perform switching in accordance with a signal outputted from the magnetic pole sensor 22 shown in FIG. 3 is normally decided, the number of signals corresponding to the respective phases results in one where the output signal of the magnetic pole sensor 22 is taken for the three phases.

Thus, in the present embodiment, the position of the magnetic pole sensor 22 is arranged in such a manner that the signal of the magnetic pole sensor 22 reaches an intermediate timing between the induced voltage of the 1U phase and the induced voltage of the 2U phase at which the maximum torque shown in FIG. 10(a) is obtained. Based on the signal of the magnetic pole sensor 22, such a signal U+ as shown in FIG. 10(c) is set as a gate signal for each of the switching elements M1U+ and M2U+. An inverted signal of the signal U+ is sets as a gate signal U– for each of M1U– and M2U–. At this time, a dead time is provided between the signals U+ and U–. V-phase gate signals V+ and V– are respectively signals 120° out of phase with respect to the gate signals U+ and U–. Further, V-phase gate signals W+ and W– are respectively signals 240° out of phase with respect to the gate signals U+ and U–.

As the voltage-driven system as mentioned above, the gate signals have been set so as not to turn on and off minutely. Thus, an improvement in the rate of utilization of a power supply voltage and a reduction in switching loss can be carried out without performing PWM where a battery voltage for a vehicle or the like is limited.

While the independent two three-phase windings are controlled using the switching elements of the twelve arms, a circuit configuration can be simplified by setting the gate signals as the three phase signals. Since the used magnetic pole sensor can be used as a three-phase signal sensor as it is in this case, the circuit of the current three-phase AC generator can be used as it is.

An operation corresponding to another example at the time that the AC generator in the driving/electric-power generating system for vehicle according to the present embodiment is operated as a motor, will next be explained using FIG. 11. A configuration at the time that the AC generator is operated as the motor, is similar to that shown in FIG. 9.

Figure 10:
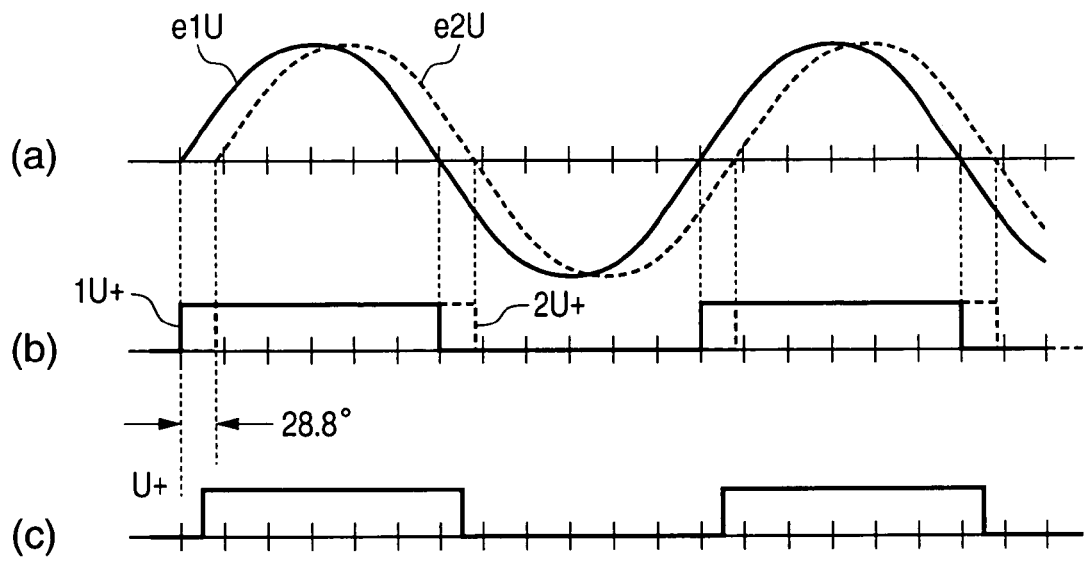
FIG. 10 is an operation waveform diagram of the vehicle AC generator employed.
Figure 11:
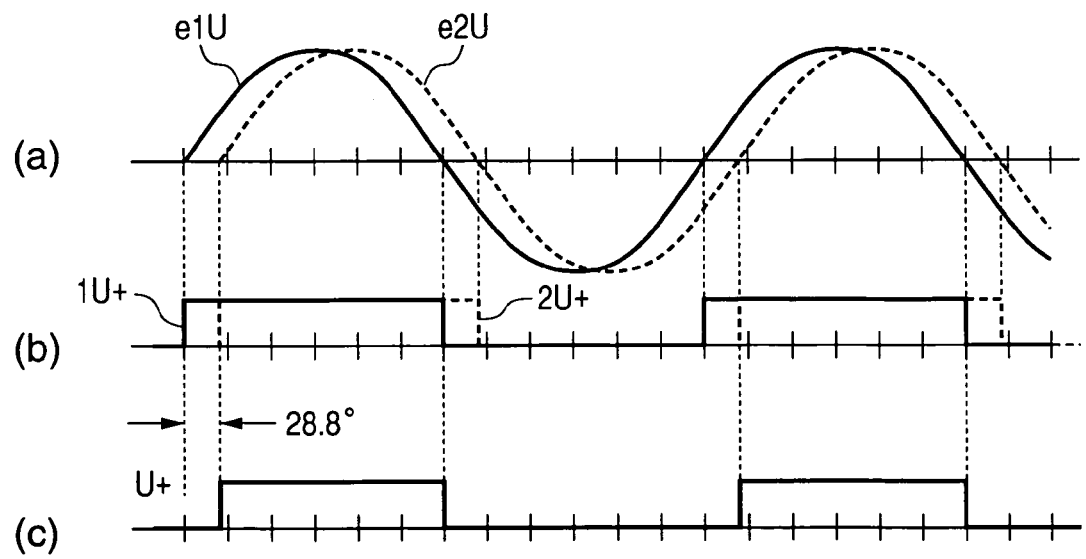
FIG. 11 is an operation waveform diagram corresponding to another example of the vehicle AC generator.

FIG. 11 is an operation waveform diagram corresponding to another example of the AC generator. Incidentally, the same reference numerals as those shown in FIGS. 1 through 10 indicate the same parts respectively.

FIGS. 11(a) and 11(b) are similar to FIGS. 10(a) and 10(b). Although each of the gate signals for the two switching elements M1U+ and M2U+ is produced with the intermediate timing between the 1U-phase induced voltage of the first coil group 3a and the 2U-phase induced voltage of the second coil group 3b in the example shown in FIG. 10, AND signals of induced voltages e1U and e2U shown in FIG. 11(a) are set as gate signals as shown in FIG. 11(c) in the present example. It is also considered that OR signals of their induced voltage signals are used. These gate signal timings may be outputted directly from the magnetic pole sensor or may be produced in accordance with signal post-processing.

A torque waveform at the time that the AC generator according to the present embodiment is operated as a motor, will next be described using FIG. 12.

Figure 12:
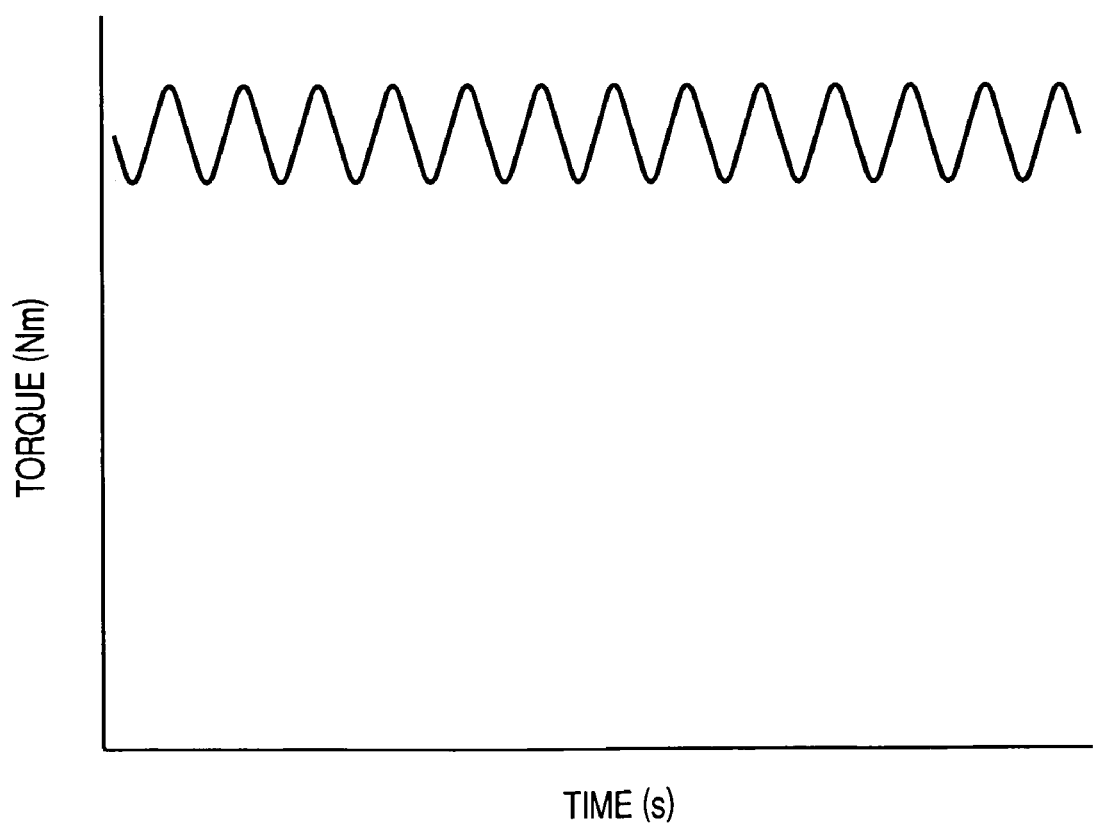
FIG. 12 is a torque waveform diagram of the vehicle AC generator.

FIG. 12 is a torque waveform diagram of the AC generator according to one embodiment of the present invention.

The horizontal axis of FIG. 12 shows time, and the vertical axis thereof shows torque. FIG. 12 shows a torque waveform where three-phase 180° voltage driving is effected on the three-phase 2Y windings shown in FIG. 9.

A configuration and an operation at the time that the AC generator in the driving/electric-power generating system for vehicle according to the present embodiment is operated as a generator, will next be explained using FIGS. 13 and 14.

Figure 13:
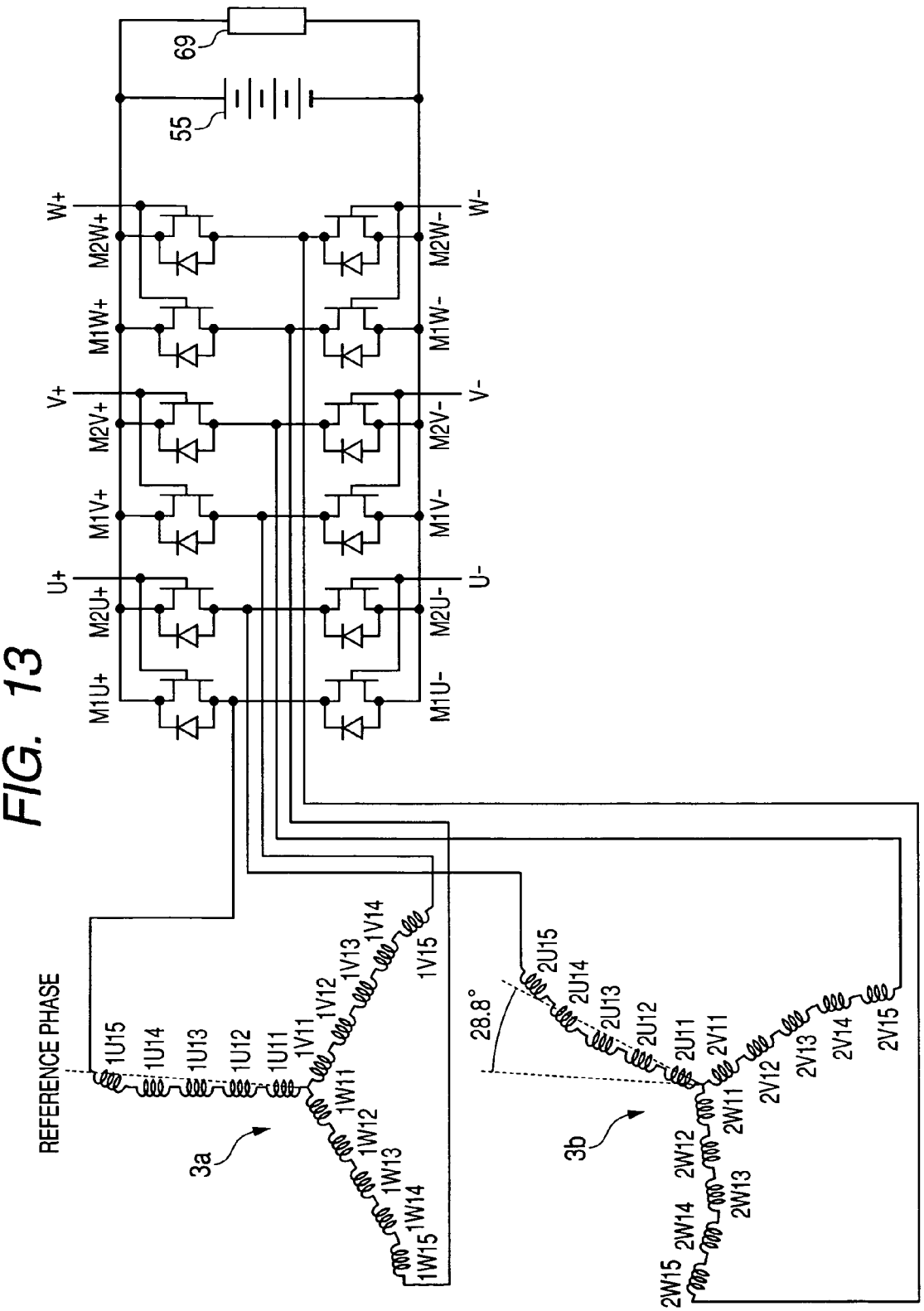
FIG. 13 is a circuit diagram showing the vehicle AC generator.
Figure 14:
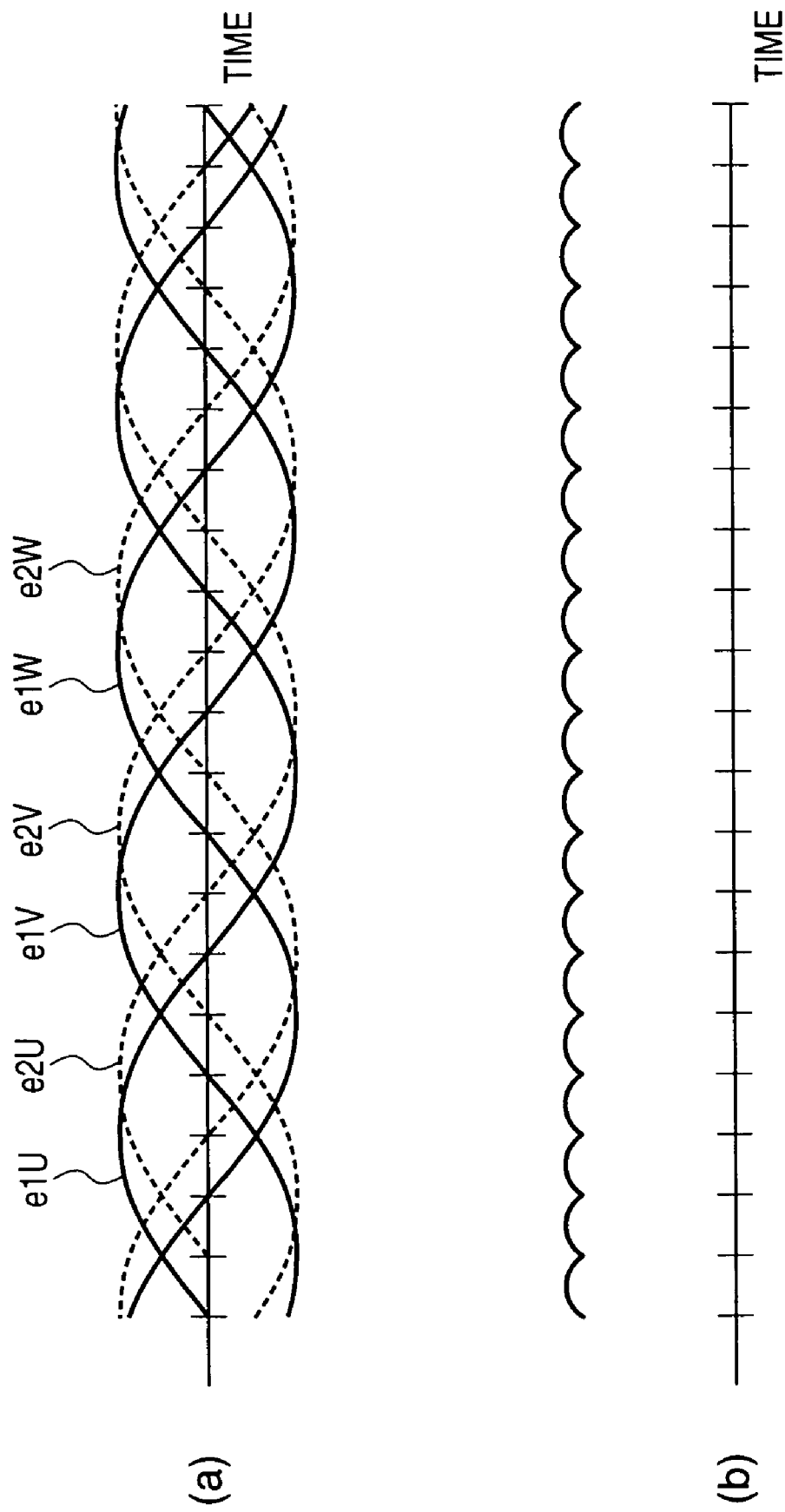
FIG. 14 is an operation waveform diagram of the vehicle AC generator.

FIG. 13 is a circuit diagram of the AC generator according to one embodiment of the present invention. FIG. 14 is an operation waveform diagram of the AC generator. Incidentally, the same reference numerals as shown in FIGS. 1 through 8 indicate the same parts respectively.

While the circuit configuration shown in FIG. 13 is similar to FIG. 9, an electrical load 69 is connected which is supplied with power generated by the generator. Diodes are connected to their corresponding switching elements M1U+ through M2W–. The generated power is rectified by use of the diodes.

When the electric power generation command signal 62 shown in FIG. 1 turns ON after the AC generator starts to rotate by the engine, the AC generator 100 is brought to an electric power generation mode. Described specifically, in the AC generator 100, a field current flowing through the field coil 6 is controlled according to a filed current command for excitation outputted from the regulator 102 so that the voltage of the battery is held in constant.

FIG. 14(a) shows induced voltages generated at respective phase coils. FIG. 14(b) shows a voltage waveform diode-rectified by the inverter unit 101.

Since the diodes are connected in parallel with the switching elements even if the switching elements (MOS-FETs) are in an off state, an AC voltage is generated in the coil of each phase as shown in FIG. 14(a). The generation of electric power can be done when the generated voltage becomes higher than the voltage of the battery 55. By rectifying the induced voltage waveforms of the respective phases shown in FIG. 14(a) by the diodes, they result in such a full-wave rectified voltage waveform and current waveform as shown in FIG. 14(b). Since the current AC generator incorporates the diodes therein and full-wave rectifies the voltages of the three-phase windings, the present AC generator is exactly identical to it in operation.

Another configuration and operation at the time that the AC generator in the driving/electric-power generating system for vehicle according to the present embodiment is operated as a generator, will next be explained using FIGS. 15 through 19.

Figure 15:
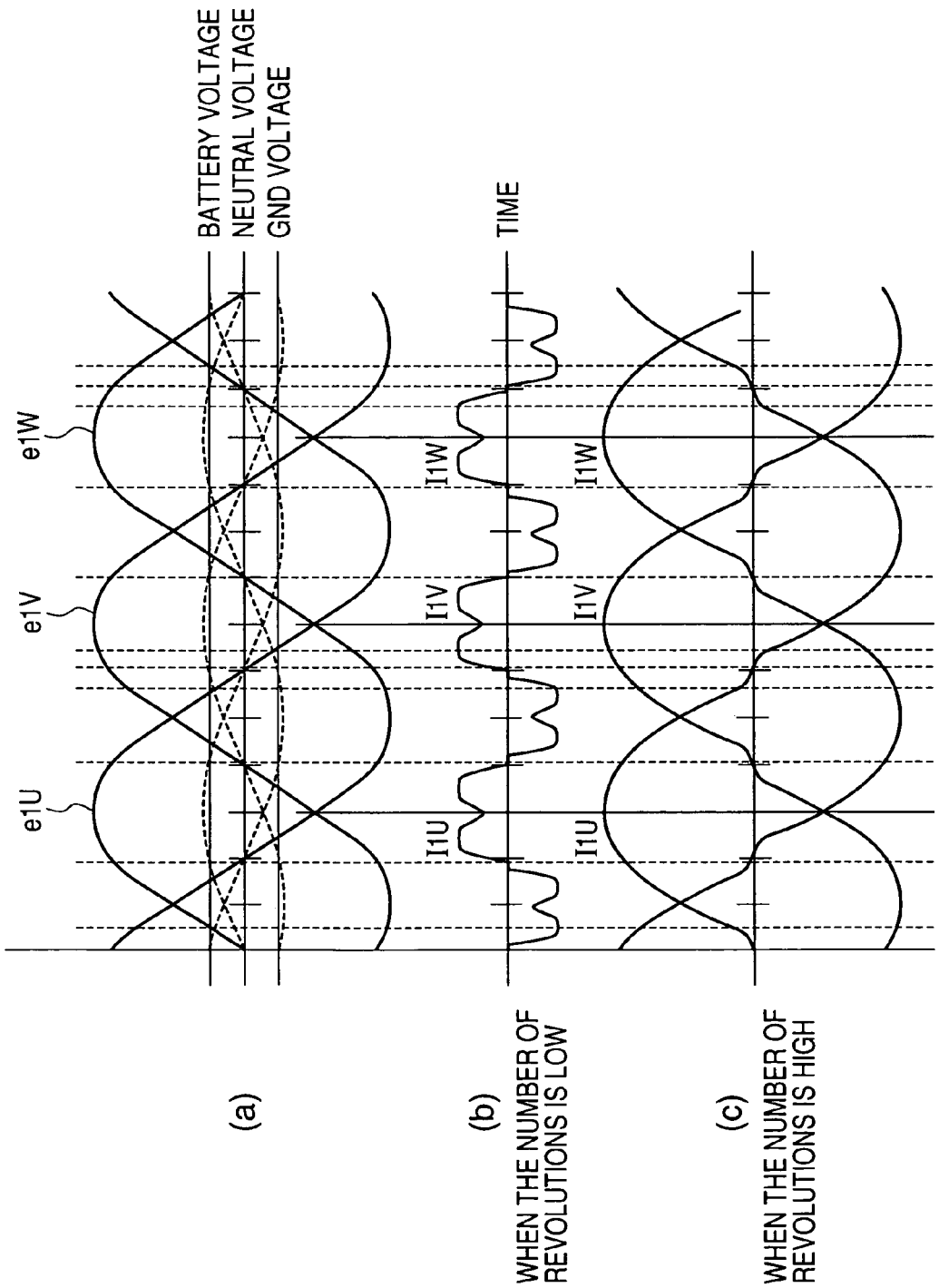
FIG. 15 is a diagram for describing a relationship between an induced voltage produced in three phase windings of a first coil group of the vehicle AC generator.

FIG. 15 is a diagram for describing a relationship between induced voltages generated in three-phase windings of a first coil group at the AC generator and a battery voltage.

When switching elements are of MOS-FETs, the loss of each MOS can be determined by the product of an on resistance and a current. Assuming that, for example, a current of 100 A flows where the on resistance is 3 mΩ, a loss of 30 W is produced. On the other hand, since the loss is determined by the product of an on voltage and a current in the case of a diode, a loss produced where 100 A flows at an on voltage of 0.8V becomes 80 W. When both are compared, rectification using the MOS-FETs enables a reduction in loss. Thus, voltage rectification is made using the MOS-FETs in the present embodiment. Incidentally, since the MOS-FETs are bidirectional switches, there is a possibility that the current reversely flows from the battery where the corresponding gate signal is accidentally turned on. It is therefore necessary to avoid such a situation.

FIG. 15(a) shows the relationship between the induced voltages produced in the three-phase windings of the first coil group and the battery voltage. Solid lines of FIG. 15(a) indicate induced voltage waveforms where the number of revolutions or the engine speed is high, and shows a case in which the voltages are sufficiently higher than the battery voltage. Waveforms indicated by dotted lines indicate a case in which the number of revolutions is low, i.e., a case in which the voltages for the respective phases are slightly higher than the battery voltage. In the two cases, a phase current waveform at the time that the number of revolutions is low, does not reach a sine wave as shown in FIG. 15(b). On the other hand, FIG. 15(c) shows a case in which the number of revolutions is high. Current waveforms at the generation of electric power also approach sine waves with a rise in the number of revolutions.

Figure 17:
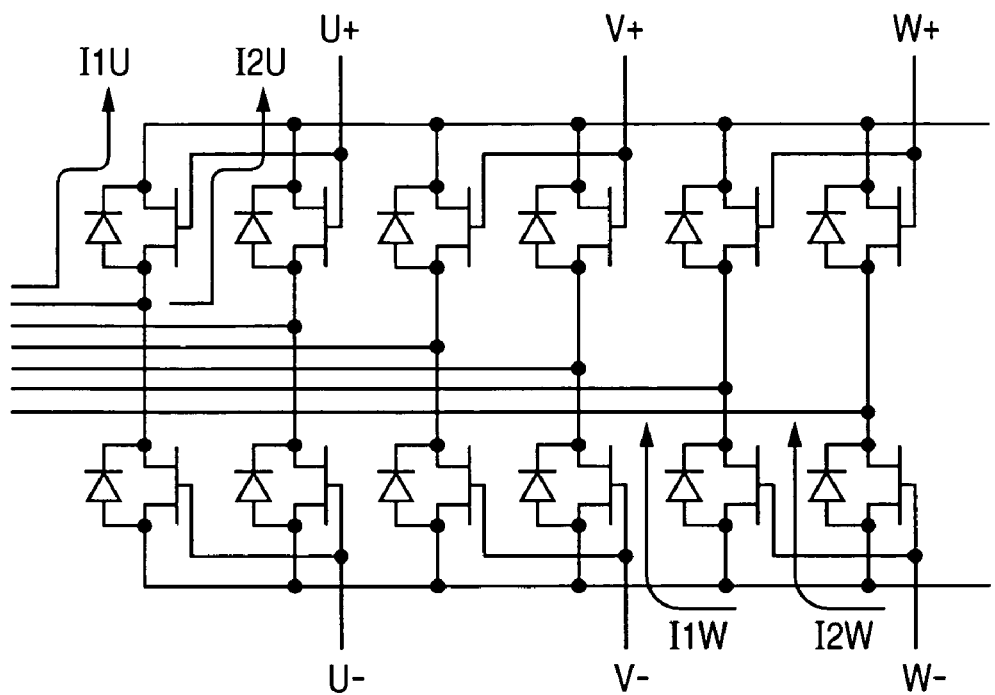
FIG. 17 is a circuit diagram at the rectification of the MOS-FETs of the vehicle AC generator.
Figure 18:
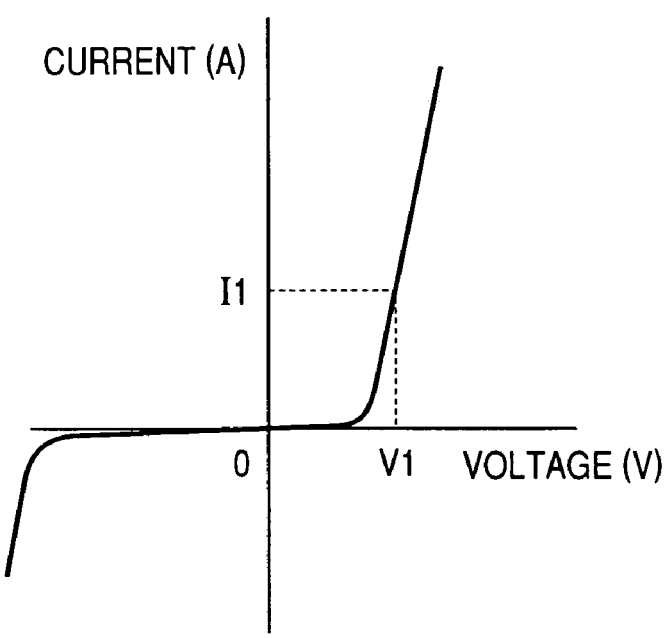
FIG. 18 is a characteristic diagram of a diode employed in the vehicle AC generator.

The operation at the rectification by the MOS-FETs will next be explained using FIGS. 16 through 18.

Figure 16:
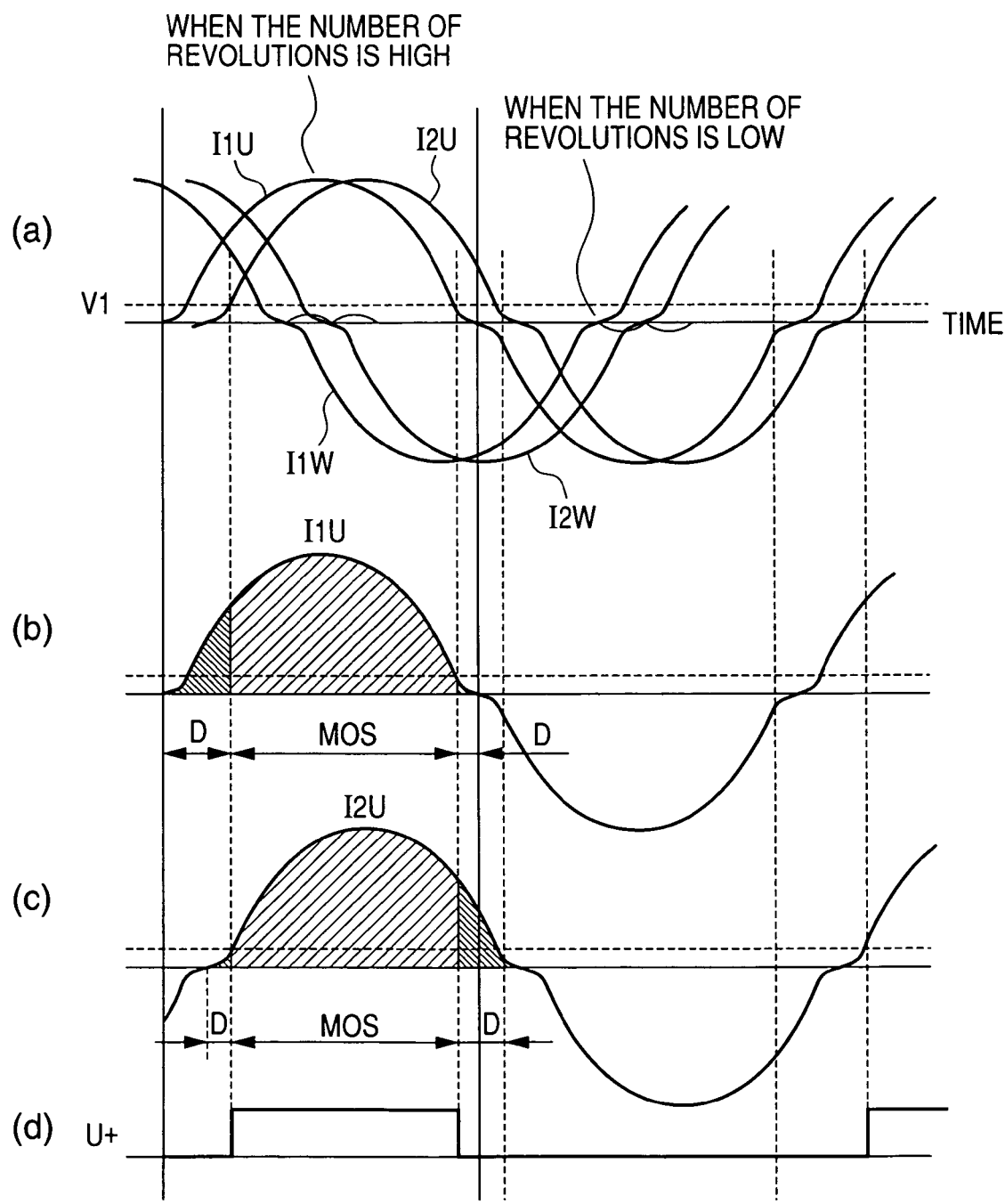
FIG. 16 is an operation waveform diagram at the rectification of MOS-FETs of the vehicle AC generator.

FIG. 16 is an operation waveform diagram at the rectification of the MOS-FETs of the AC generator in the driving/electric-power generating system for vehicle according to one embodiment of the present invention. FIG. 17 is a circuit diagram at the rectification of the MOS-FETs of the AC generator. FIG. 18 is a characteristic diagram of a diode used in the vehicle AC generator.

Since the rectification using the MOS-FETs enables a reduction in loss as compared with the diode rectification, the effect of improving efficiency can be expected. Thus, it is preferably necessary to perform the rectification using the MOS-FETs without using the diodes. Since, however, the current (between the source and drain) flows in both directions in the case of the MOS-FETs, it is necessary to turn on the MOS-FETs only when each coil voltage becomes higher than the battery voltage. When the timing is incorrectly turned on when the coil voltage is lower than the battery voltage, the current from battery flows into the corresponding coil because the battery is high in potential. Therefore, the accuracy of timing for each gate signal becomes important. Since the value of the current is also low and the amplitude of each voltage is also small at low speeds, the conventional same diode rectification is performed at low speeds.

Since the 1U and 2U phases of the three-phase windings are operated by one gate signal in the present example, an on signal of each gate is produced based on a current rise signal of a current I2U for the 2U phase delayed in current phase. An off signal is turned off with timing at which currents for 1W and 2W phases become equal to each other. Since the diode is disposed in parallel between the source and drain of each MOS-FET, the current flows through the diode as in the conventional case unless the MOS-FET is turned on, whereby full-wave rectification is enabled.

The diode has the characteristic that when the current flows in the forward direction, its on voltage increases. Thus, when a current I1 flows in the forward direction of the diode as shown in FIG. 18 and the on voltage reaches to V1, the voltage is detected and a gate signal for a MOS-FET of U+ shown in FIG. 17 is turned on. The timing provided to turnoff it can be produced by detecting the voltage applied between terminals of diodes for MOS-FETs used for 1W– and 2W– phases in a manner similar to the creation of the timing for turning-on. Thus, it is possible to realize the timing by detecting the voltage between the terminals of the diodes connected in parallel with the MOS-FETs of the respective phases.

FIG. 16(a) shows induced voltages for 1U and 2U phases. Thick solid lines indicate induced voltages where the number of revolutions is high, whereas thin solid lines indicate induced voltages where the number of revolutions is low. Since the phase of currents I1U flowing through the 1U-phase coil leads as compare with the phase of currents I1U flowing thorough the 2U-phase at phases of the respective phase-current shown in FIG. 16(a), an on-signal timing provided to turn on a gate signal U+ shown in FIG. 16(d) is produced based on the current I2U that flows through the diode. Accordingly, a section D becomes a diode rectification section with respect to such a current I1U current shown in FIG. 16(b). Also a section MOS indicates a rectification section of MOS.

Since the timing provided to turn off each gate signal is determined from currents I1W and I2W of the W phase shown in FIG. 16(a), the gate signal is turned off with the timing shown in FIG. 16(d), so that I1W is switched from the MOS rectification to the diode rectification as shown in FIG. 16(b). I2U shown in FIG. 16(c) is also changed from the MOS rectification to the diode rectification in like manner.

A circuit for producing the gate signals described in FIG. 16 will next be explained using FIG. 19.

Figure 19:
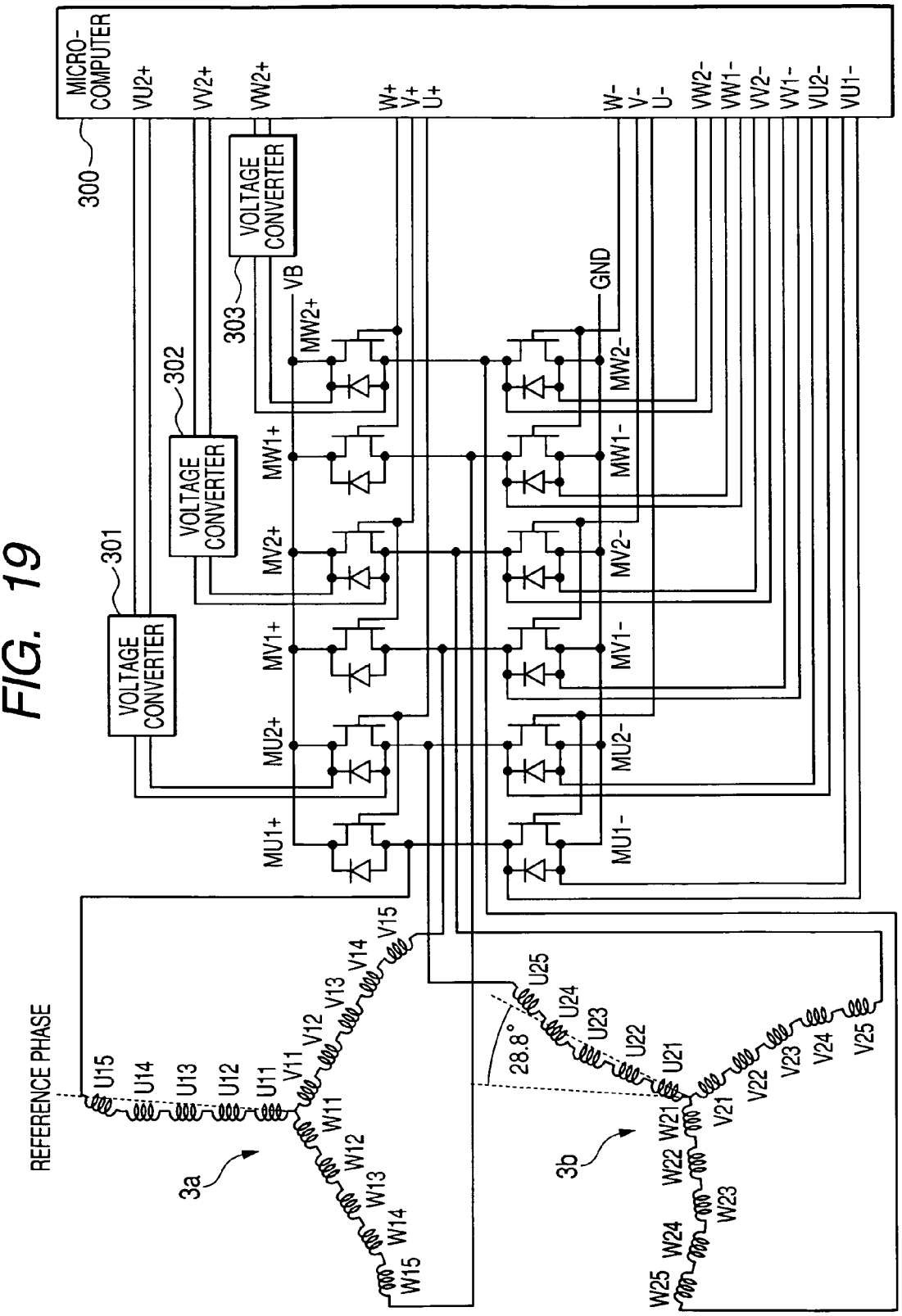
FIG. 19 is a circuit diagram at the rectification of MOS-FETs of the vehicle AC generator.

FIG. 19 is a circuit diagram at MOS-FET rectification of the AC generator according to one embodiment of the present invention. Incidentally, the same reference numerals as those shown in FIG. 13 indicate the same parts respectively.

In the present embodiment, upper arms are provided with voltage converters 301, 302 and 303. The voltage converters 301, 302 and 303 are level converting circuits for respectively converting detected voltages to ground levels of a microcomputer 300. Voltages applied across diodes of the upper arms are level-converted by the voltage converters 301, 302 and 303, and the level-converted voltages is taken into the microcomputer 300. In lower arms, voltages applied across diodes connected to all MOS-FETs are directly detected by the microcomputer 300. The microcomputer 300 produces gate signals U+, V+, W+, U−, V− and W− each having the timing described in FIG. 16, based on the detected diode voltages and outputs them to their corresponding gates of the MOS-FETs.

Another circuit configuration for producing the gate signals described in FIG. 16 will next be explained using FIG. 20.

Figure 20:
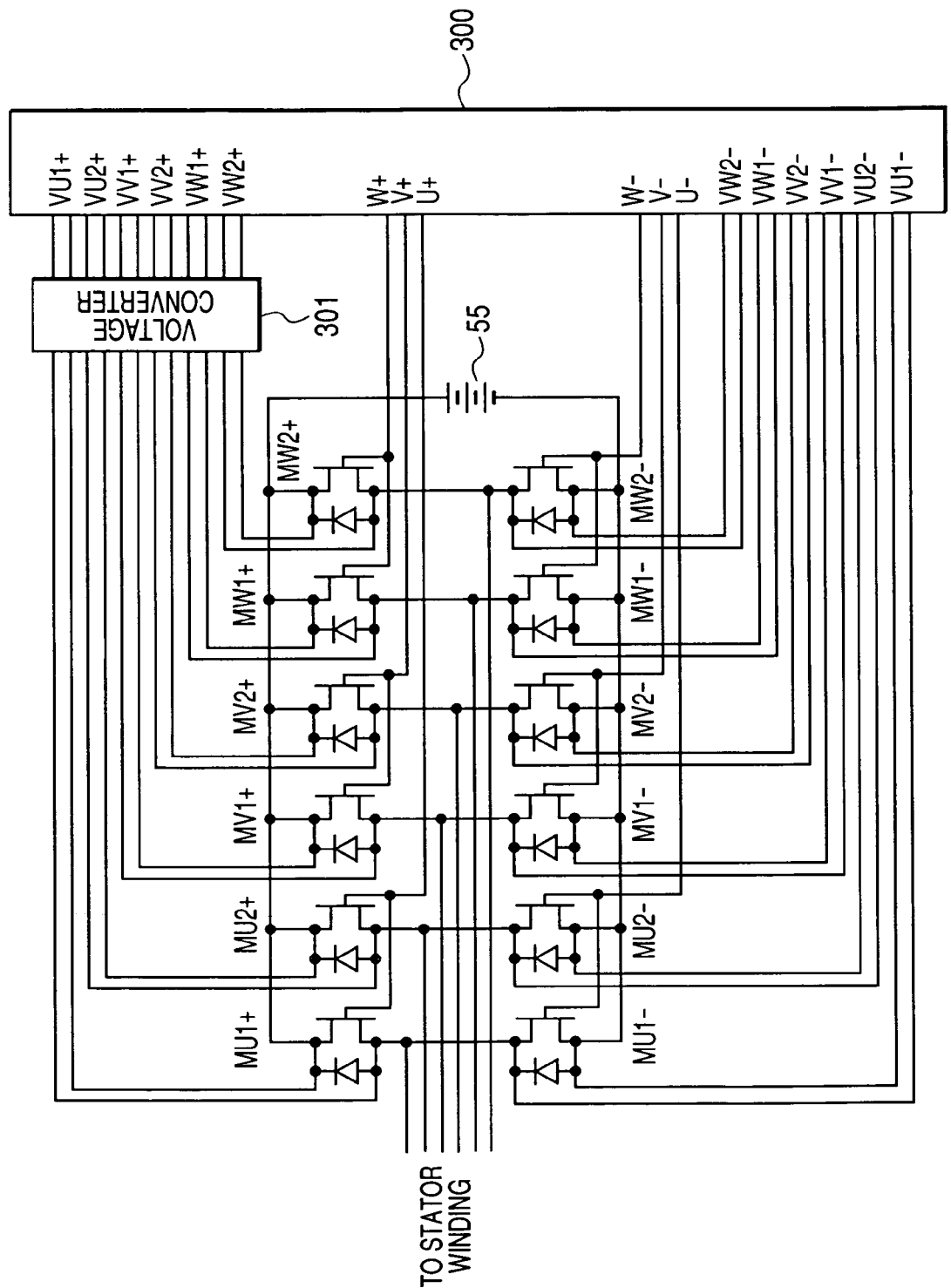
FIG. 20 is another circuit diagram at the rectification of MOS-FETs of the vehicle AC generator.

FIG. 20 is another circuit diagram at MOS-FET rectification of the AC generator according to one embodiment of the present invention. Incidentally, the same reference numerals as those shown in FIG. 13 indicate the same parts respectively.

In the present embodiment, voltages applied across diode terminals of respective upper and lower arms are all detected by a microcomputer 300. A voltage converter 301 is of a level converter circuit for converting each of detected voltages to a ground level of the microcomputer 300.

Another circuit configuration and operation for producing the gate signals described in FIG. 16 will next be explained using FIGS. 21 through 25.

The circuit configuration for producing the gate signals described in FIG. 16 will first be described using FIGS. 21 and 22.

Figure 21:
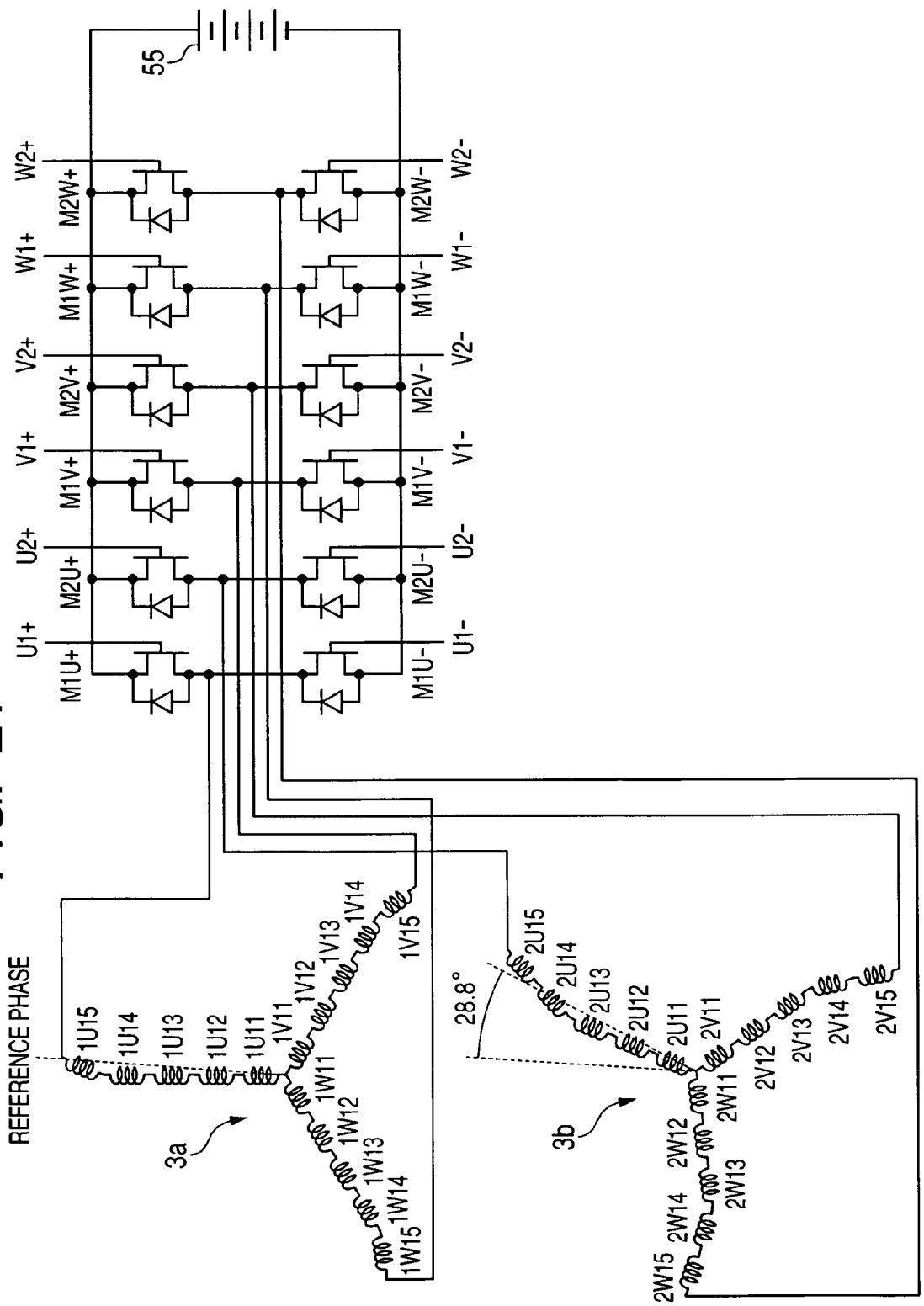
FIG. 21 is a further circuit diagram at the rectification of MOS-FETs of the vehicle AC generator.
Figure 22:
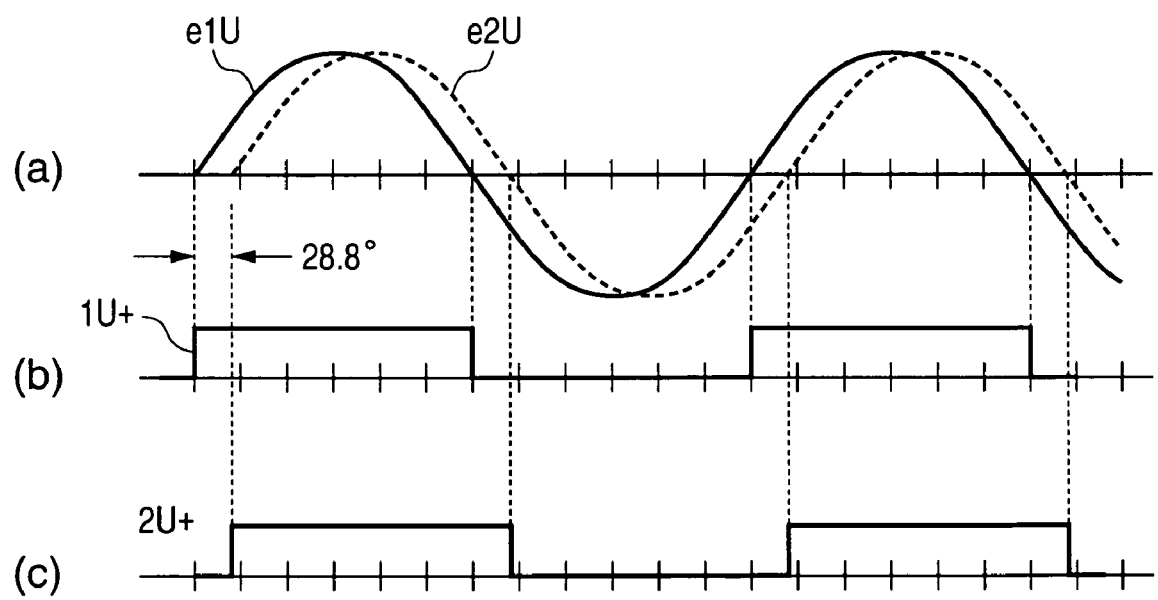
FIG. 22 is a timing chart at other circuit configurational example at the rectification of the MOS-FETs of the vehicle AC generator.

FIG. 21 is another circuit diagram at MOS-FET rectification of the AC generator. FIG. 22 is a timing chart at other circuit configurational example at MOS-FET rectification of the AC generator. Incidentally, the same reference numerals as those shown in FIG. 13 indicate the same parts respectively.

In the present example, all of gate signals U1+, U1−, U2+, U2−, V1+, V1−, V2+, V2−, W1+, W1−, W2+ and W2− of MOS-FETs at Upper and lower twelve arms can be individually controlled. Since the respective phases can be effectively utilized by division of the gate signals, a torque ripple at motor driving can be reduced.

As shown in FIG. 21, in-phase coils of first and second coil groups are shifted by 28.8 electrical angles with respect to one another. Magnetic pole sensors 22 corresponding to six phases are prepared so as to match with their corresponding induced voltage waveforms shown in FIG. 22(a). In accordance with the outputs of the respective magnetic pole sensors, for example, a gate signal 1U+ shown in FIG. 22(b) is produced with respect to an induced voltage of an e1U phase, and a gate signal 2U+ shown in FIG. 22(c) is produced with respect to an induced voltage of an e2U phase, whereby six-phase driving is simply enabled. Even if the magnetic sensors correspond to three phases, signals for another three phase can be computed and produced by a microcomputer from the number of revolutions and time on the basis of signals of the three-phase magnetic pole sensors. Consequently, three-phase signals other than for the magnetic pole sensors can also be produced relatively easily. Therefore, driving small in torque ripple can be performed even at the six-phase inverters and three-phase magnetic pole sensors. Even in this case, a 180° voltage control system that can make the best of a battery voltage effectively is adopted without adopting PWM control used for industry. Since each MOS is always on during a section corresponding to an electrical angle of 180°, a switching loss can also be reduced to thereby enable an improvement in efficiency, and the influence of radio noise or the like due to switching noise can also be reduced.

Figure 24:
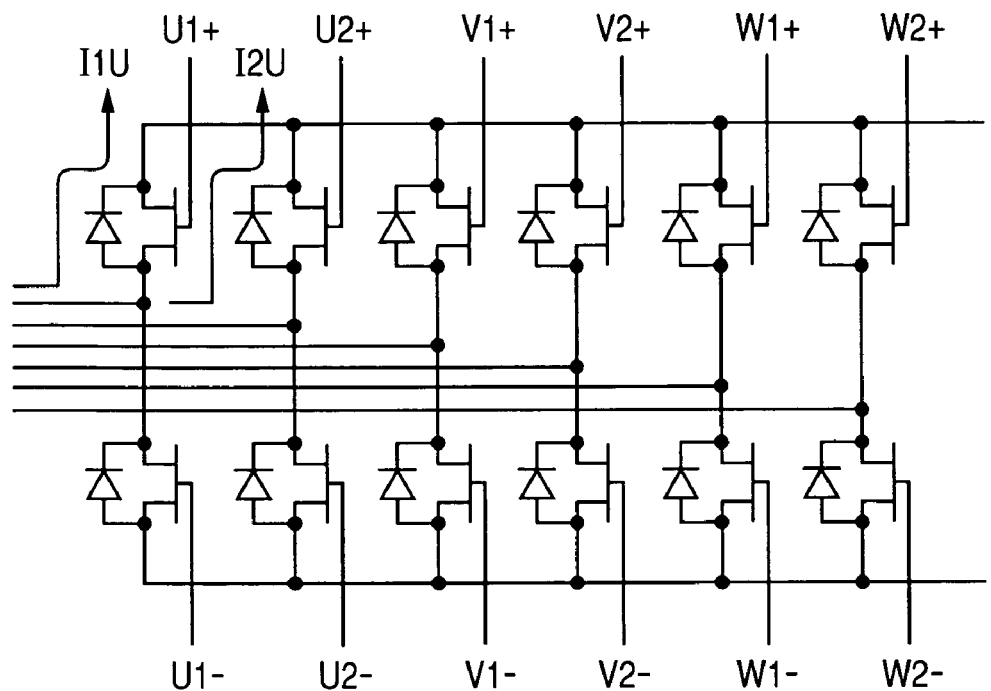
FIG. 24 is a still further circuit diagram at the rectification of the MOS-FETs of the MOS-FETs of the vehicle AC generator.
Figure 25:
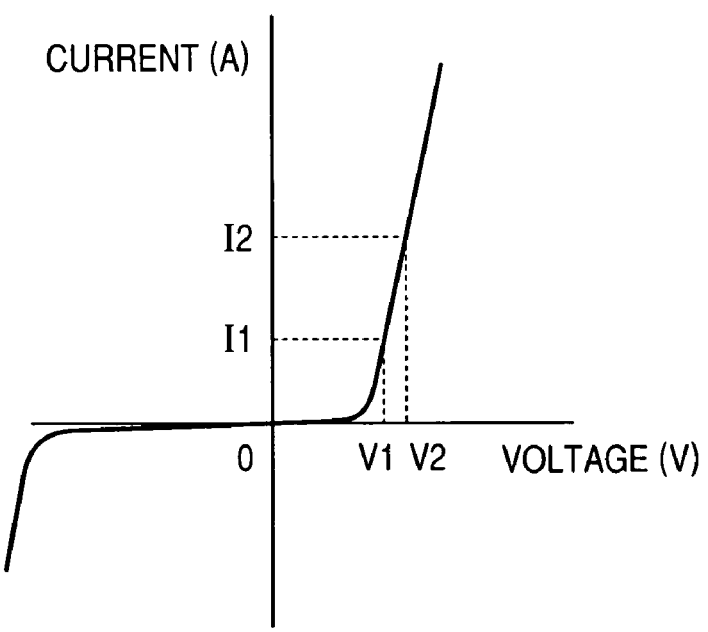
FIG. 25 is a characteristic diagram of a diode employed in the vehicle AC generator.

Another operation at rectification by MOS-FETs will next be explained using FIGS. 23 through 25.

Figure 23:
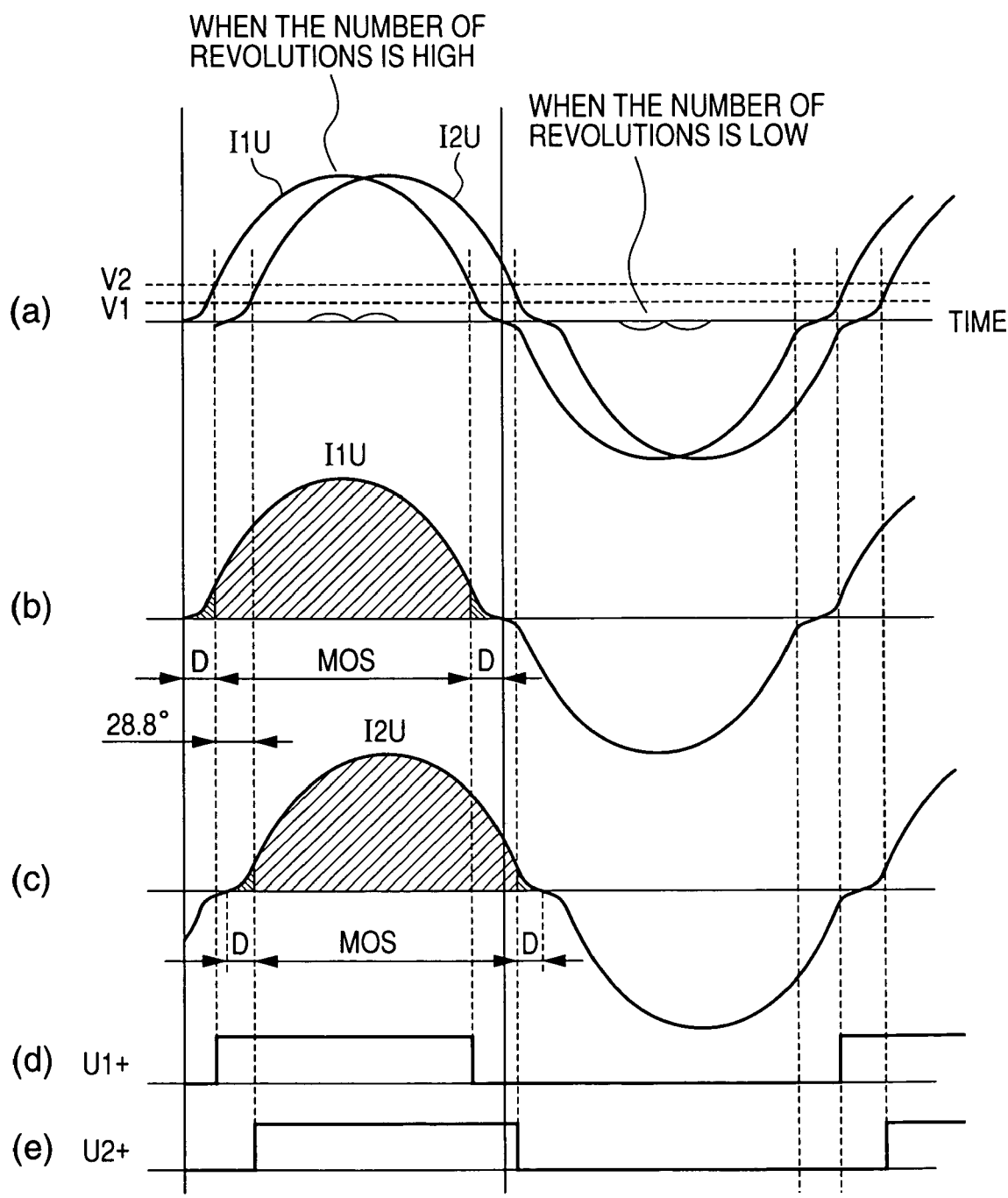
FIG. 23 is another operation waveform diagram at the rectification of the MOS-FETs of the vehicle AC generator.

FIG. 23 is another operation waveform diagram at MOS-FET rectification of the AC generator according to one embodiment of the present invention. FIG. 24 is another circuit diagram at MOS-FET rectification of the AC generator. FIG. 25 is a characteristic diagram of each diode in the AC generator.

As to the operation, the voltage is detected from current flowing through the diode parallel-connected to each MOS as mentioned above. A V1 voltage (see FIG. 25) is used at ON, and a V2 voltage (see FIG. 25) higher than the on voltage V1 is used at OFF. Increasing the voltage at OFF in this way brings about the effects of enabling prevention of chattering and prevention of a delay in offtiming, and brings about an effect in preventing the backflow of the current.

In FIGS. 23(b) and 23(c), a section D corresponds to a diode rectification section, and a section MOS corresponds to a MOS rectification section. Since the MOS section can be taken long, rectification less reduced in loss is enabled. Even in this case, since a diode current is low where the number of revolutions is low, each detected signal is not increased till the V1 voltage. Therefore, since a signal for the MOS is not turned on, diode rectification is carried out. Upon MOS rectification at the generation of electric power, a gate signal results in a normally turned-on signal having approximately 180 electrical angles.

Thus, the six phases are provided in such a manner that the gates of MOSs can be controlled individually. Consequently, the section for MOS rectification can be made long and the operation high in efficiency can be done.

Another configuration and operation at the time that the AC generator according to the present embodiment is operated as a motor, will next be described using FIG. 26.

Figure 26:
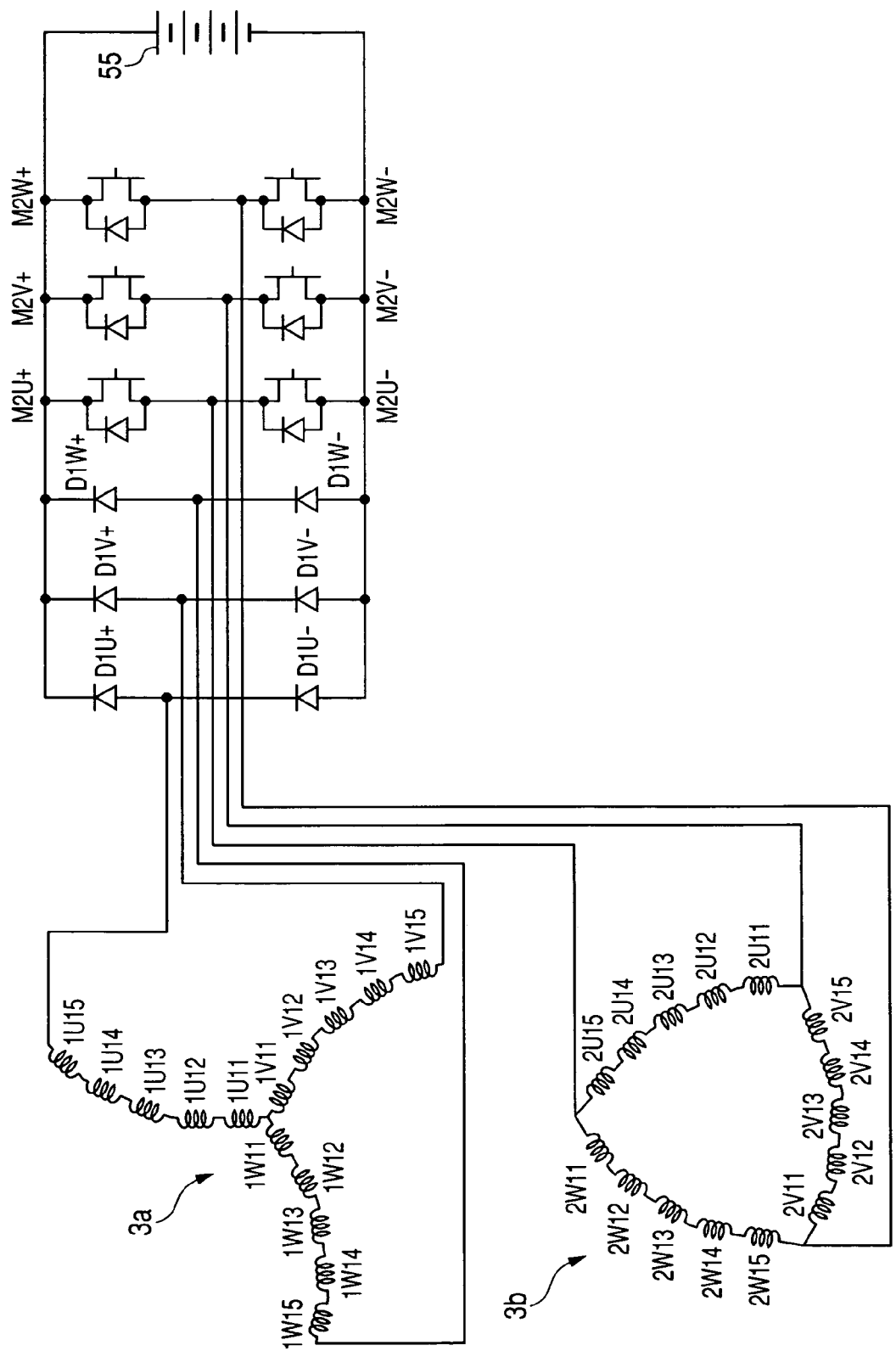
FIG. 26 is another circuit diagram of the vehicle AC generator.

FIG. 26 is another circuit diagram of the AC generator. Incidentally, the same reference numerals as those shown in FIG. 13 indicate the same parts respectively.

While on the contrary the three windings are alls Y-connected in the above example, a three-phase winding 3b of a second coil group on the one side is Δ-connected in the present example. Since any three-phase windings are identical in the number of turns per phase, the Δ-connected second coil group is brought to the number of turns of $1/\sqrt{3}$ if converted to the Y-connection. Thus, if the number of turns per phase of the Y-connected first coil group is taken as five, then the number of turns for conversion of Δ-connection to Y-connection is equivalent to 2.89.

When the vehicle AC generator is used as a starter motor at a 14V battery where the number of rotor poles is twelve, the number of turns may preferably be three with all things considered from the relationship of a back electromotive voltage at the rotation of a motor and the relationship of a motor current capable of being caused to flow. Since, however, there is a need to operate the AC generator as a generator after the starting up of an engine, about five turns are required as the number of turns. In the case of, for example, a vehicle AC generator in which stator windings are taken as three turns and emphasis is placed on the starting of the engine, it is good in operation as the motor but a problem arises in that the generation of electric power cannot be performed at idle upon the generation of electric power. When the power generation-oriented number of turns corresponding to five turns is taken in reverse, the back electromotive voltage becomes higher than the battery voltage, thereby causing a problem that the number of revolutions of the motor does not increase.

Thus, in the example shown in FIG. 26, a three-phase wiring 3a of a first coil group is taken as a five-turn winding, and the three-phase winding 3b of the second coil group is taken as a 2.89-turn winding in Y terms. The five turns for the three-phase winding 3a of the first coil group are connected to a full-wave rectifying circuit constituted of diodes as dedicated for the generation of electric power. Since the three-phase winding 3b of the second coil group is configured as a winding used in engine starting-up, it is connected to a three-phase inverter. That is, only the three-phase winding 3b of the second coil group is operated at the motor operation, whereas both three-phase windings 3a and 3b are operated upon the operation for the generation of electric power.

When the AC generator is operated as a motor, a current is allowed to flow through the three-phase winding 3b of the second coil group by the three-phase inverter to start up the engine. Next, when the vehicle AC generator is switched to an electric power generation mode, it is cut in at the location where the number of revolutions is low because the number of turns of the three-phase winding 3a of the first coil group is greater than the number of turns of the three-phase winding 3b of the second coil group. That is, the three-phase winding 3a of the first coil group performs an electric power generating operation at idle. Since the engine speed rises in the case of the speed of a normally-driven vehicle, the three-phase winding 3b of the second coil group is also brought to the electric power generating operation. Parallel power generation of the three-phase winding 3a of the first coil group and the three-phase winding 3b of the second coil group is done when normally driven.

Still another configuration and operation at the time that the AC generator is operated as a motor, will next be explained using FIG. 27.

Figure 27:
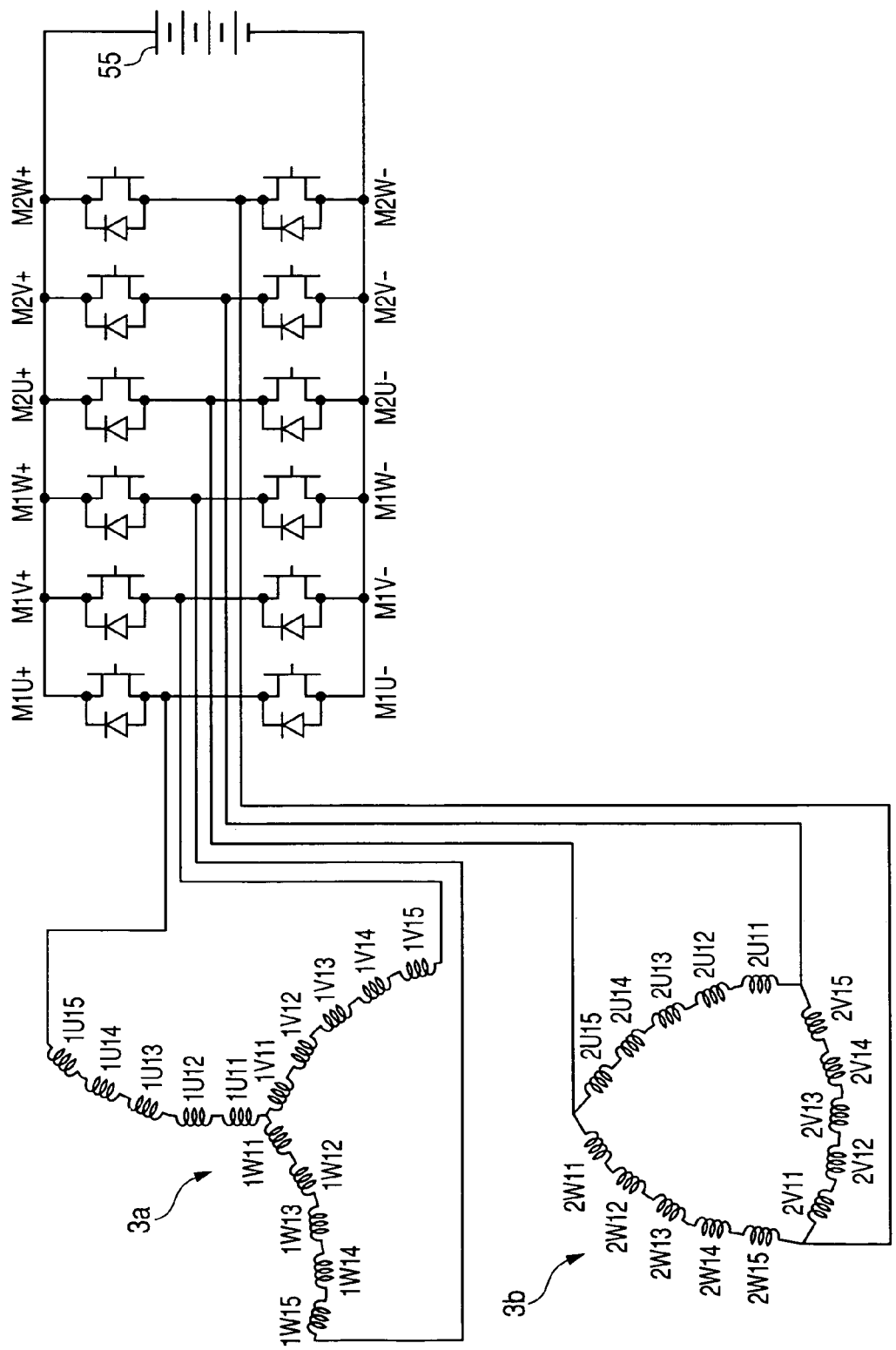
FIG. 27 is a further circuit diagram of the vehicle AC generator.

FIG. 27 is the circuit diagram of the AC generator according to one embodiment of the present invention. Incidentally, the same reference numerals as those shown in FIGS. 13 and 26 indicate the same parts respectively.

While on the contrary the diode rectification is done in the example shown in FIG. 26, the MOS inverter is used in the present example. Both three-phase windings 3a and 3b are operated upon both the motor operation and the operation for the electric power generation. The three-phase winding 3a of the first coil group is also configured so as to be capable of being driven in this way. It is therefore possible to perform assistance at the motor operation and MOS rectification at the generation of electric power, thus leading to the effect of improving efficiency.

While the above description has been made of the three-phase windings of two pairs, a plurality of three-phase windings of three and four pairs can also be realized by disposing power elements identical to the number of coils and setting gate signals of in-phase coils different in neutral point as the same signals. Although the gate signals are set as 180° voltage drive signals, PWM control and 180° voltage-driven control may be performed in combination where there is an allowance for the battery voltage and a switching loss of each MOS can be sufficiently cooled.

Further, although the present embodiment has principally described that the engine is started up by the AC generator as a motor at the idle stop, it is also possible to switch the AC generator from the electric power generation mode to the motor assist mode even at the normal operation where the battery voltage is high and operate the AC generator as the motor to thereby assist the engine. In order to enable the generation of electric power of the AC generator even at a low speed range in particular, the number of rotor poles is set to a range of about 12 to 16. Therefore, the frequency becomes excessively high under PWM control at high rpm so that the control cannot be well performed. Therefore, when the vehicle AC generator is at low speed, the PWM control may be performed, whereas in the case of engine assist at a high speed range, switching to a 180° voltage-driven system may be performed to execute its control. Field weakening control for weakening the field is also performed at the high speed range.

A structure of a vehicle equipped with the driving/electric-power generating system for vehicle according to the present embodiment will next be explained using FIGS. 28 and 29.

Figure 28:
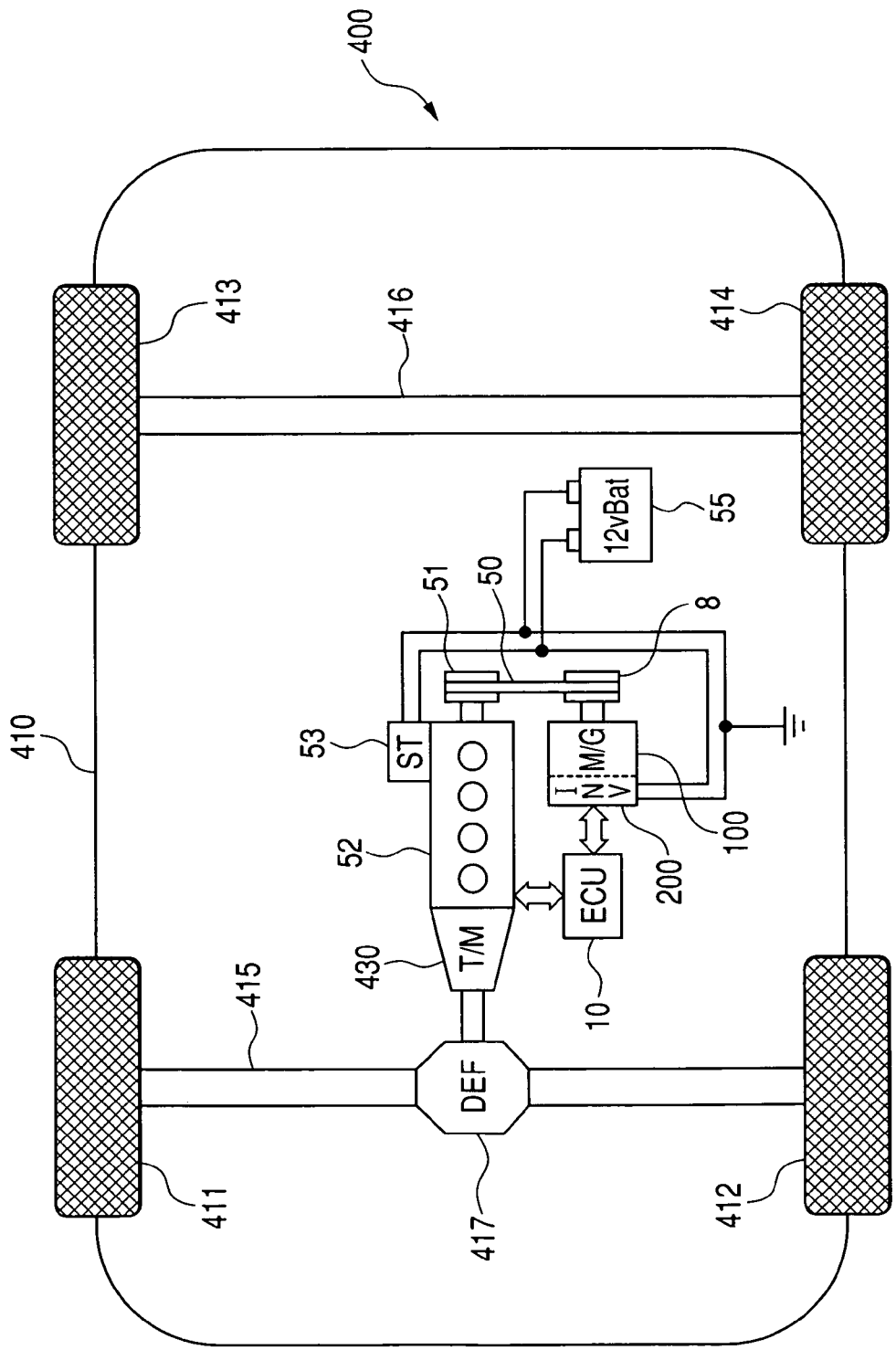
FIG. 28 is a block diagram showing a structure of a vehicle equipped with the driving/electric-power generating system for vehicle according to one embodiment of the present invention.
Figure 29:
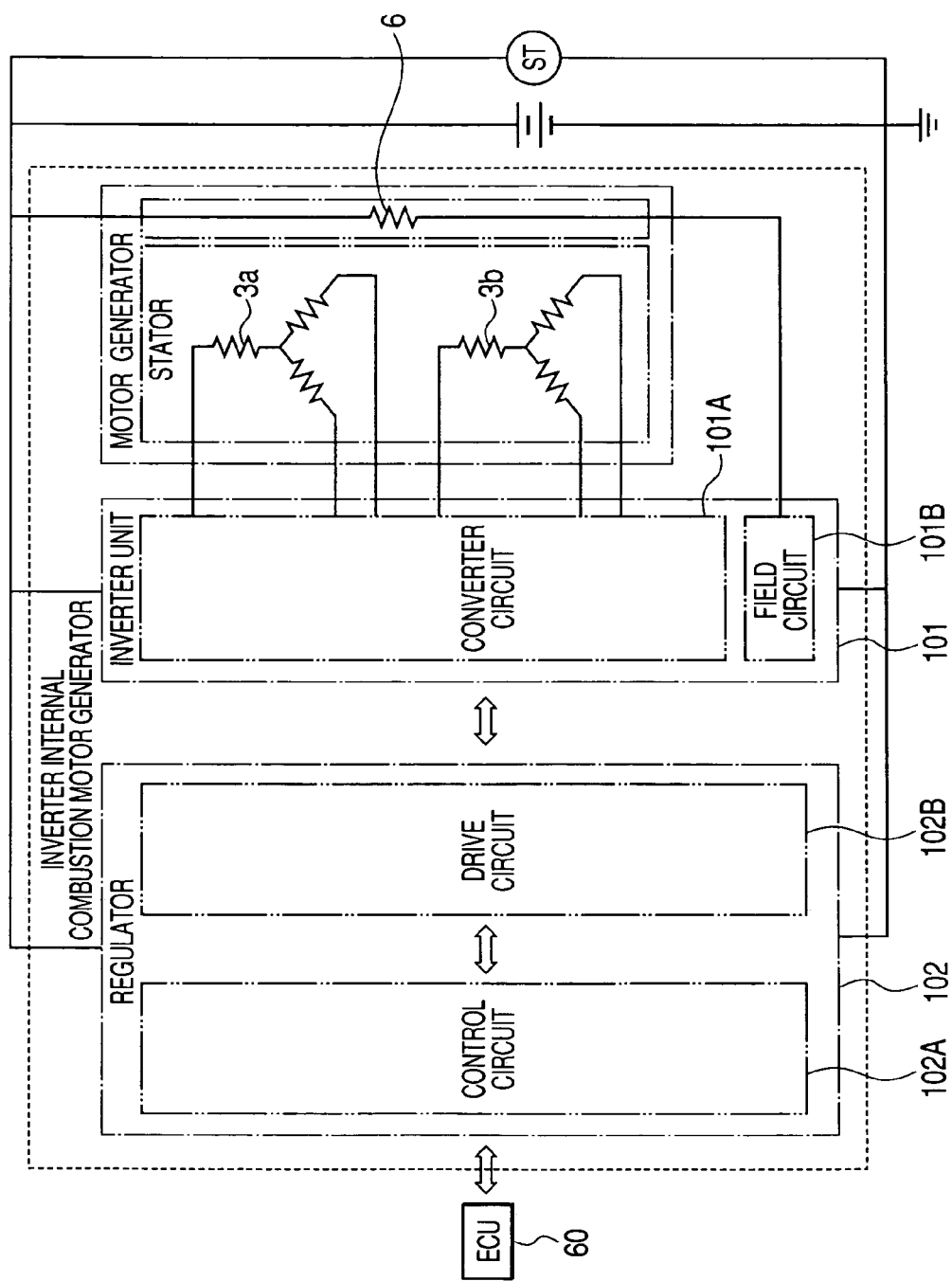
FIG. 29 is a block diagram illustrating the driving/electric-power generating system for vehicle according to one embodiment of the present invention.

FIG. 28 is a block diagram showing the structure of the vehicle equipped with the driving/electric-power generating system for vehicle according to one embodiment of the present invention. FIG. 29 is a block diagram of the driving/electric-power generating system. Incidentally, the same reference numerals as those shown in FIG. 1 indicate the same parts respectively.

The AC generator 100 of the present embodiment is a so-called inverter built-in type vehicle electric rotating machine wherein a drive unit 200 like an inverter device is assembled integrally with the main body of the electric rotating machine shown in FIG. 3. The AC generator 100 constitutes an electric power train of a vehicle 400.

The vehicle 400 to which the AC generator 100 of the present embodiment is applied, is of a so-called hybrid vehicle equipped with both an engine power train with an engine 52 corresponding to an internal combustion engine as a source of power, and an electric power train with the AC generator 100 as a source of power. The engine power train principally constitutes a drive source of the vehicle 400. The electric power train is principally used as a start-up source of the engine 52 and an electric power source of the vehicle 400. Thus, the vehicle 400 equipped with the electric power train is capable of performing so-called idling stop running which automatically stops the engine 52 at its stop such as a wait for the light to change in a state in which an ignition switch is held on, and automatically starts the engine 52 at its start to make its starting, thereby enabling an improvement in fuel efficiency and a reduction in exhaust gas.

As shown in FIG. 28, a front-wheel axle shaft 415 is rotatably supported at a front section of a vehicle body 410. Front wheels 411 and 412 are provided at both ends of the front-wheel axle shaft 415. A rear-wheel axle shaft 416 is rotatably supported at a rear section of the vehicle body 410. Rear wheels 413 and 414 are provided at both ends of the rear-wheel axle shaft 416. A differential gear 417 corresponding to a power sharing mechanism is provided in the center of the front-wheel axle shaft 415. The differential gear 417 shares a rotating drive force transferred from the engine 52 via a transmission 430 to the side-to-side front-wheel axle shaft 415. The transmission 430 changes the speed of the rotating drive force of the engine 52 and transfers it to the differential gear 417. The driving of the engine 52 is controlled by controlling the operations of engine control elements such as an injector corresponding to a fuel flow control device, a throttle corresponding to an air flow control device, etc. by an engine control unit 60.

The AC generator 100 is disposed in an engine room provided at the front section of the vehicle body 410 together with the engine 52. The AC generator 100 is mounted on the side portion of the engine 52 and mechanically coupled to the engine 52. Such mechanical coupling is realized by connecting a pulley 51 mounted to a crank shaft of the engine 52 and a pulley 8 attached to a rotatable shaft of the AC generator 100 by means of a belt 50. Thus, the AC generator 100 is capable of transferring a rotating drive force to the engine 52 at the motor operation mode and receiving a rotating drive force from the engine 52 at the generator operation mode.

As shown in FIGS. 1 and 2, the electric power train of the vehicle 400 is electrically connected to a 14 v-system in-vehicle power supply configured by the battery 55 and gives or receives electric power to the 14 v-system vehicle power supply. A starter 53 corresponding to a starting device of the engine 52, in-vehicle accessories such as a light, a radio, a turn signal lamp, etc. not shown in the drawings are electrically parallel-connected to the 14 v-system vehicle power supply. A lead battery having an output voltage of about 12 v is used as the battery 55.

As described above, the AC generator 100 is one in which the drive unit 200 including the inverter device is integrally mounted to the main body of the electric rotating machine. In the motor operation mode, the stator windings 3a and 3b are supplied with three-phase AC power controlled by the drive unit 200. The field winding 6 is supplied with a field current controlled by the drive unit 200. In the AC generator 100, since the stator windings 3a and 3b are supplied with the three-phase AC power and the field winding 6 is supplied with the field current to produce a rotating magnetic field, the rotor is rotated with respect to the stator. Thus, the AC generator 100 operates as an electric motor and generates a rotating drive force for starting the engine 52.

On the other hand, in the generator operation mode, when the field current is supplied to the field winding 6 and the rotor is rotated by the rotating drive force of the engine 52, the AC generator 100 induces voltages at the stator windings 3a and 3b. Thus, the AC generator 100 operates as an electric generator and generates three-phase AC power for charging the battery 55. Incidentally, although the present embodiment explains, as an example, a case in which a synchronous AC electric rotating machine is used as the AC generator 100, an induced AC electric rotating machine or a permanent magnet type AC generator may be used as the AC generator 100.

The drive unit 200 is a power converting device which converts DC power supplied from the battery 55 to three-phase AC power or converts three-phase AC power obtained by the generation of electric power of the AC generator 100 to DC power. Described specifically, the inverter device is roughly divided into an inverter unit 101 and a regulator 102 as shown in FIG. 29. The inverter unit 101 is provided with a converter circuit 101A and a field circuit 101B. The converter circuit 101A is a power control circuit which converts DC power supplied from the battery 55 to three-phase AC power or converts three-phase AC power supplied from the stator windings 3a and 3b to DC power. The field circuit 101B is a field current control circuit which controls a field current supplied from the battery 55 to the field winding 6. The regulator 102 is equipped with a control circuit 102A and a drive circuit 102B. The control circuit 102A is a control logic circuit which outputs command signals for controlling the operations of the converter circuit 101A and the field circuit 101B to the drive circuit 102B in accordance with various detect signals (feedback signals) about a command signal supplied from an upper control device, e.g., the engine control unit 60, an interphase voltage of the AC generator 100, a terminal voltage of the battery 55, etc. The drive circuit 102B outputs a drive signal for operating each of the converter circuit 101A and the field circuit 101B to the converter circuit 101A and the field circuit 101B in response to a command signal supplied from the control circuit 102A. Incidentally, in order to improve mountability of the drive unit 200 on the main body of the electric rotating machine, a voltage control device conventionally mounted to the vehicle AC generator is assembled integrally with the drive unit 200 and space to mount the drive unit 200 is ensured in the present embodiment.

According to the present embodiment as described above, an inverter circuit similar to the conventional one can be used where a vehicle AC generator is operated as a motor. Therefore, a reduction in cost can be performed. Upon the generation of electric power, the loss of each rectifying element can be reduced by MOS-rectifying an inverter element and hence the efficiency at the power generation can be enhanced. Further, the optimum number of windings can be set to a motor operation and an electric power generating operation by adoption of a complex winding of a Y-connection and a Δ-connection, and hence a vehicle generator most suitable for the motor driving and the electric power generating operation can be reached.

What is claimed is:

1. A driving/electric-power generating system for vehicle comprising:

an electric rotating machine comprised of a rotor and a stator having a three-phase winding; and a three-phase inverter connected to the three-phase winding, wherein the three-phase winding is comprised of a first and second three-phase winding, the first and second three-phase windings are independent three-phase windings, wherein U-phase, V-phase and W-phase windings of the first three-phase winding are electrically displaced with respect to corresponding U-phase, V-phase and W-phase windings of the second three-phase winding, and wherein switching elements for respective phases in the three-phase inverter are connected in parallel by the number of windings in the first and second three-phase windings, each winding of the first and second three-phase windings is individually connected to each of the parallel switching elements by phase, wherein the switching elements of the inverter are divided into three groups corresponding to three phases, and the switching elements of each same group are driven with the same gate signal, and wherein an on-off timing of the three-phase inverter corresponding to the respective U-phase, V-phase and W-phase windings of the first and second three-phase windings is an intermediate timing between induced voltages of the respective U-phase, V-phase and W-phase windings.

2. A driving/electric-power generating system for vehicle comprising:

an electric rotating machine comprised of a rotor and a stator having a three-phase winding; and a three-phase inverter connected to the three-phase winding, wherein the three-phase winding is comprised of a first and second three-phase winding, the first and second three-phase windings are independent three-phase windings, wherein U-phase, V-phase and W-phase windings of the first three-phase winding are electrically displaced with respect to corresponding U-phase, V-phase and W-phase windings of the second three-phase winding, and wherein switching elements for respective phases in the three-phase inverter are connected in parallel by the number of windings in the first and second three-phase windings, each winding of the first and second three-phase windings is individually connected to each of the parallel switching elements by phase, wherein the switching elements of the inverter are divided into three groups corresponding to three phases, and the switching elements of each same group are driven with the same gate signal, and wherein the switching elements are MOS-FETs and a timing provided to perform switching to MOS rectification upon an electric power generating operation of the electric rotating machine is produced based on a coil current delayed in phase, of the same phase coils of the independent three-phase windings.

3. The driving/electric-power generating system for vehicle according to claim 2, wherein the coil current delayed in phase is detected from a current of a diode disposed in parallel with each of the MOS-FETs.

4. The driving/electric-power generating system for vehicle according to claim 2, wherein upon the electric power generating operation of the electric rotating machine, diode rectification is taken when the current that flows through the electric rotating machine is of a low current, and MOS rectification is taken when the current is of a high current.

5. A driving/electric-power generating system for vehicle comprising:
   an electric rotating machine comprised of a rotor and a stator having a three-phase winding; and
   a three-phase inverter connected to the three-phase winding,
   wherein the three-phase winding is comprised of a first and second three-phase winding, the first and second three-phase windings are independent three-phase windings,
   wherein U-phase, V-phase and W-phase windings of the first three-phase winding are electrically displaced with respect to corresponding U-phase, V-phase and W-phase windings of the second three-phase winding,
   wherein switching elements for respective phases in the three-phase inverter are connected in parallel by the number of windings in the first and second three-phase windings, each winding of the first and second three-phase windings is individually connected to each of the parallel switching elements by phase, wherein each phase winding of the first and second three-phase windings is individually connected to each switching element of the inverter by phase, the each switching elements is controlled by individual gate signals and the inverter is of a 180° voltage-driven system, and wherein the switching elements are MOS-FETs, and upon the electric power generating operation of the electric rotating machine, the gate signals that drive the MOS-FETs are produced by converting diode currents flowing through individual diodes to voltages, and a reference voltage for producing an on-signal of the gate signals and a reference voltage for producing an off-signal of the gate signals are different from each other in voltage.

6. The driving/electric-power generating system for vehicle according to claim 5, wherein upon the electric power generating operation of the electric rotating machine, the reference voltage for the off signal of the gate signals is higher than that for the on-signal of the gate signals.

7. The driving/electric-power generating system for vehicle according to claim 5, wherein the independent three-phase windings are constituted of at least a pair of a Y-connection and a Δ-connection, and the respective windings are set identical in the number of turns, and one three-phase winding is used for driving and generation of electric power and the other three- phase winding is used only for generation of electric power.

8. The driving/electric-power generating system for vehicle according to claim 7, wherein the Y-connection and Δ-connection are respectively connected to an inverter.

* * * * *